United States Patent
Hwang et al.

(10) Patent No.: US 11,212,066 B2
(45) Date of Patent: *Dec. 28, 2021

(54) TRANSMITTING NPUSCH AND WIRELESS DEVICE THEREOF

(71) Applicant: LG Electronics Inc., Seoul (KR)

(72) Inventors: Seunggye Hwang, Seoul (KR); Joonkui Ahn, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 155 days.

This patent is subject to a terminal disclaimer.

(21) Appl. No.: 16/597,639

(22) Filed: Oct. 9, 2019

(65) Prior Publication Data
US 2020/0044815 A1 Feb. 6, 2020

Related U.S. Application Data

(63) Continuation of application No. 16/257,630, filed on Jan. 25, 2019, now Pat. No. 10,454,661, which is a
(Continued)

(30) Foreign Application Priority Data
May 10, 2018 (KR) .......... 10-2018-0053975

(51) Int. Cl.
*H04L 5/14* (2006.01)
*H04W 72/04* (2009.01)
(Continued)

(52) U.S. Cl.
CPC .............. *H04L 5/14* (2013.01); *H04L 5/0053* (2013.01); *H04L 27/2666* (2013.01);
(Continued)

(58) Field of Classification Search
CPC ..... H04L 5/14; H04L 5/0053; H04L 27/2666; H04L 5/0051; H04W 72/0446; H04W 74/0833
See application file for complete search history.

(56) References Cited

U.S. PATENT DOCUMENTS 10,454,661 B2 * 10/2019 Hwang ................ H04L 5/0053
2009/0196238 A1 8/2009 Cheng et al.
(Continued)

FOREIGN PATENT DOCUMENTS

| CN | 105790908 | 7/2016 |
| CN | 106664520 | 5/2017 |

(Continued)

OTHER PUBLICATIONS

Japanese Office Action in Japanese Appln. No. 2019-514258, dated May 26, 2020, 5 pages (with English translation).
(Continued)

*Primary Examiner* — Christine Ng
(74) *Attorney, Agent, or Firm* — Fish & Richardson P.C.

(57) ABSTRACT

The disclosure of the present specification provides a method for performing a narrowband physical uplink shared channel (NPUSCH) transmission. The method may comprise: determining a start position of the NPUSCH transmission; performing the NPUSCH transmission, if the start position of the NPUSCH transmission is determined as a first of two contiguous subframes; and postponing the NPUSCH transmission, if the start position of the NPUSCH transmission is determined as a second of the two contiguous subframes. The two contiguous subframes may be configured as a time division duplex (TDD) uplink subframe based on at least one of TDD configurations 1 and 4. The two contiguous subframes may be defined for a subcarrier spacing of 3.75 kHz.

20 Claims, 27 Drawing Sheets

Related U.S. Application Data continuation of application No. PCT/KR2018/008600, filed on Jul. 30, 2018.

(60) Provisional application No. 62/659,632, filed on Apr. 18, 2018, provisional application No. 62/591,203, filed on Nov. 28, 2017, provisional application No. 62/586,207, filed on Nov. 15, 2017, provisional application No. 62/543,381, filed on Aug. 10, 2017.

(51) Int. Cl.
*H04L 5/00* (2006.01)
*H04L 27/26* (2006.01)
*H04W 74/08* (2009.01)

(52) U.S. Cl.
CPC ... *H04W 72/0446* (2013.01); *H04W 74/0833* (2013.01); *H04L 5/001* (2013.01); *H04L 5/0051* (2013.01)

(56) References Cited

U.S. PATENT DOCUMENTS

| | | | |
|---|---|---|---|
| 2014/0293947 A1* | 10/2014 | Nishikawa | H04W 72/1257 370/329 |
| 2016/0050706 A1* | 2/2016 | Zhang | H04L 5/0055 370/280 |
| 2016/0330011 A1* | 11/2016 | Lee | H04L 5/0066 |
| 2016/0345301 A1* | 11/2016 | Webb | H04W 72/0446 |
| 2017/0047978 A1* | 2/2017 | Kim | H04B 7/0626 |
| 2017/0171865 A1 | 6/2017 | Hwang et al. | |
| 2017/0180095 A1* | 6/2017 | Xue | H04L 5/0048 |
| 2017/0373907 A1* | 12/2017 | Tan | H04L 5/0091 |
| 2019/0045528 A1* | 2/2019 | Xu | H04W 72/12 |
| 2019/0081765 A1* | 3/2019 | Si | H04W 72/04 |
| 2021/0022117 A1 | 1/2021 | Yi et al. | |

FOREIGN PATENT DOCUMENTS

| | | |
|---|---|---|
| CN | 106961736 | 7/2017 |
| CN | 106992847 | 7/2017 |
| KR | 20150132368 | 11/2015 |
| WO | 2016208897 | 12/2016 |
| WO | 2017017583 | 2/2017 |
| WO | 2017057943 | 4/2017 |
| WO | WO2019/032833 | 2/2019 |

OTHER PUBLICATIONS

MediaTek Inc., Discussion on uplink timing relationship for 2 HARQ processes, R1-1611866, 3GPP TSG RAN WG1 Meeting #87, Reno, USA Nov. 14-18, 2016, 4 pages.

ZTE, On collision between NPRACH and NPUSCH, R1-165132, 3GPP TSG RAN WG1 Meeting #85, Nanjing, China May 23-27, 2016, 4 pages.

ZTE, Remaining issue on collision of NPUSCH and NPRACH, R1-167316, 3GPP TSG RAN WG1 Meeting #86, Gothenburg, Sweden Aug. 22-26, 2016, 4 pages.

Alcatel-Lucent, Alcatel-Lucent Shanghai Bell, "Considerations of TDD NB-IoT", R1-160181, 3GPP TSG RAN WG1 NB-IoT ad-hoc, Budapest, Hungary, Jan. 18-20, 2016, 4 pages.

Ericsson, "Introduction of NB-IoT enhancements", R1-1704155, 3GPP TSG-RAN1 Meeting #88, Athens, Greece, Feb. 13-17, 2017, 29 pages.

3rd Generation Partnership Project; Technical Specification Group Radio Access Network; Evolved Universal Terrestrial Radio Access (E-UTRA); Physical channels and modulation (Release 14), 3GPP TS 36.211 V14.3.0 (Jun. 2017), 51 pages.

3rd Generation Partnership Project; Technical Specification Group Radio Access Network; "Evolved Universal Terrestrial Radio Access (E-UTRA); Physical channels and modulation (Release 15)", 3GPP TS 36.211 V15.2.0, Jun. 2018, 50 pages.

EP Office Action in European Application No. EP 18833593, dated Feb. 11, 2020, 8 pages.

Ericsson, "Time masks and transmission templates for the eLAA UL," R4-1700796, Presented at TSG-RAN Working Group 4 (Radio) meeting #82, Athens, Greece, Feb. 13-17, 2017, 6 pages.

ZTE, "Resource allocation of uplink data channel for NB-IoT," R1-161868, Presented at 3GPP TSG RAN WG1 NB-IoT Ad-Hoc Meeting, Sophia Antipolis, France, Mar. 22-24, 2016, 4 pages.

* cited by examiner

TRANSMITTING NPUSCH AND WIRELESS DEVICE THEREOF

CROSS-REFERENCE TO RELATED APPLICATIONS

This application is a continuation of U.S. application Ser. No. 16/257,630, filed on Jan. 25, 2019, which is a continuation of International Application PCT/KR2018/008600, with an international filing date of Jul. 30, 2018, which claims the benefit of U.S. Provisional Applications No. 62/543,381 filed on Aug. 10, 2017, No. 62/586,207 filed on Nov. 15, 2017, No. 62/591,203 filed on Nov. 28, 2017, No. 62/659,632 filed on Apr. 18, 2018, and Korean Patent Application No. 10-2018-0053975 filed on May 10, 2018, the contents of which are all hereby incorporated by reference herein in their entirety.

BACKGROUND OF THE INVENTION

Field of the Invention

The present invention relates to mobile communication.

Related Art

In recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user. Meanwhile, since the existing LTE system has been designed for the purpose of supporting high-speed data communication, it has been regarded as an expensive communication method. However, the MTC may be widely used only when a price is low according to a characteristic thereof. Therefore, a method of reducing a bandwidth for MTC to be smaller than a system bandwidth has been examined for cost reduction.

Further, the MTC has recently attracted attention for the Internet of Things (IOT).

One way to reduce the cost of an IoT device is considering that the IoT device operates on a reduced bandwidth compared to the cell's system bandwidth.

IoT communication operating on such a reduced bandwidth is called NB (Narrow Band)-IoT communication.

In the NB-IoT, the subcarrier interval may be reduced differently from LTE. However, it is difficult to apply the reduced subcarrier spacing to the time division duplex (TDD) scheme.

SUMMARY OF THE INVENTION

Accordingly, a disclosure of the present specification has been made in an effort to solve the aforementioned problem.

In order to achieve the aforementioned purpose, a disclosure of the present specification provides a method for performing a narrowband physical uplink shared channel (NPUSCH) transmission. The method may comprise: determining a start position of the NPUSCH transmission; performing the NPUSCH transmission, if the start position of the NPUSCH transmission is determined as a first of two contiguous subframes; and postponing the NPUSCH transmission, if the start position of the NPUSCH transmission is determined as a second of the two contiguous subframes. The two contiguous subframes may be configured as a time division duplex (TDD) uplink subframe based on at least one of TDD configurations 1 and 4. The two contiguous subframes may be defined for a subcarrier spacing of 3.75 kHz.

The NPUSCH transmission may be performed if the two contiguous subframes are configured as valid subframes.

The NPUSCH transmission may be performed when the two contiguous subframes are not configured as invalid subframes.

The postponing of the NPUSCH transmission may be further performed, if at least one of the two contiguous subframes is configured as an invalid subframe.

The postponing of the NPUSCH transmission may be further performed, if the two contiguous subframes are overlapped with a narrowband physical random access channel (NPRACH) transmission.

The NPUSCH transmission may be mapped to a plurality of resource elements (REs) which are not used for a reference signal.

When an invalid subframe is included in the two contiguous subframes used for the NPUSCH transmission, and when a repetition level of the NPUSCH transmission is smaller than or equal to a specific value, the NPUSCH transmission may be postponed. However, when an invalid subframe is included in the two contiguous subframes used for the NPUSCH transmission, and when the repetition level of the NPUSCH transmission is greater than or equal to a specific value, the NPUSCH transmission may be punctured.

Postponing of the NPUSCH transmission may be performed when a number of valid subframes included in the two contiguous subframes is smaller than or equal to 1.

When at least one of the two contiguous subframes includes an invalid subframe, the NPUSCH transmission mapped to a RE in the invalid subframe may be punctured.

In order to achieve the aforementioned purpose, a disclosure of the present specification provides a wireless device for performing a narrowband physical uplink shared channel (NPUSCH) transmission. The wireless device may comprise: a transceiver; and a processor configured to control the transceiver and determines a start position of the NPUSCH transmission. The processor may perform the NPUSCH transmission, if the start position of the NPUSCH transmission is determined as a first of two contiguous subframes. The processor may postpone the NPUSCH transmission, if the start position of the NPUSCH transmission is determined as a second of the two contiguous subframes. The two contiguous subframes may be configured as a time division duplex (TDD) uplink subframe based on at least one of TDD configurations 1 and 4. The two contiguous subframes may be defined for a subcarrier spacing of 3.75 kHz.

According to the disclosure of the present invention, the problem of the conventional technology described above may be solved.

DESCRIPTION OF EXEMPLARY EMBODIMENTS

Figure 1:
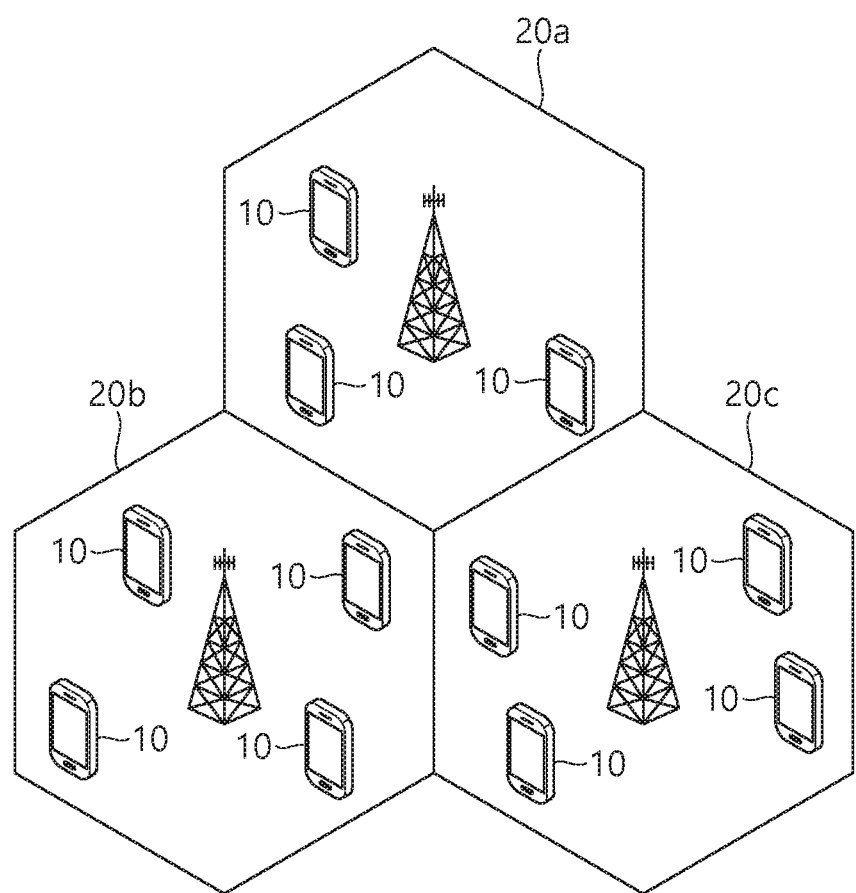
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
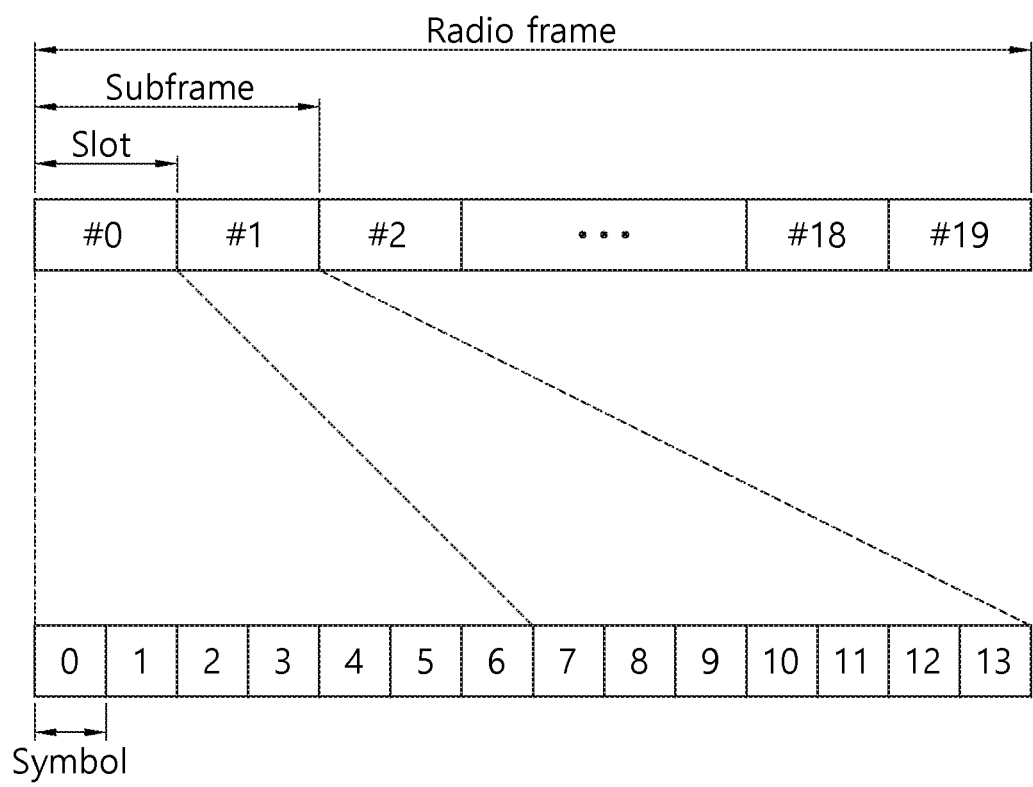
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-December) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
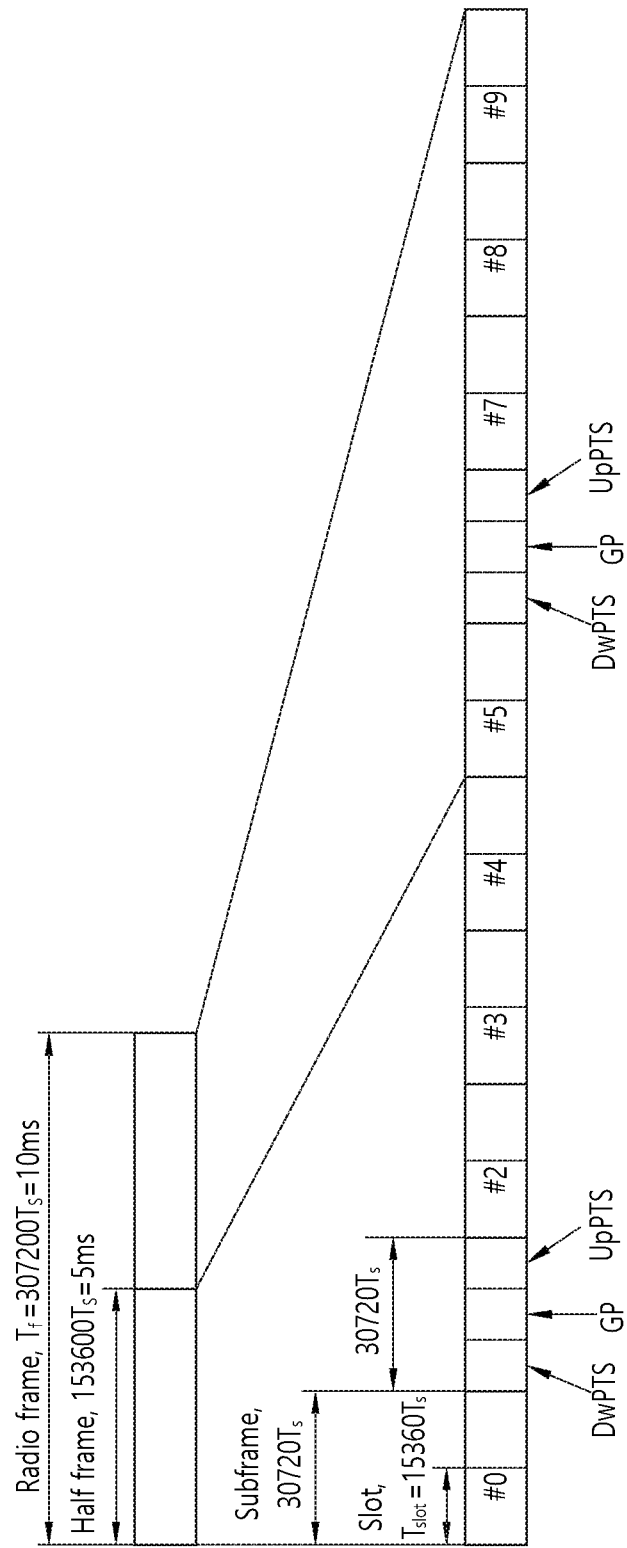
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

In what follows, IoT will be described.

Figure 4A:
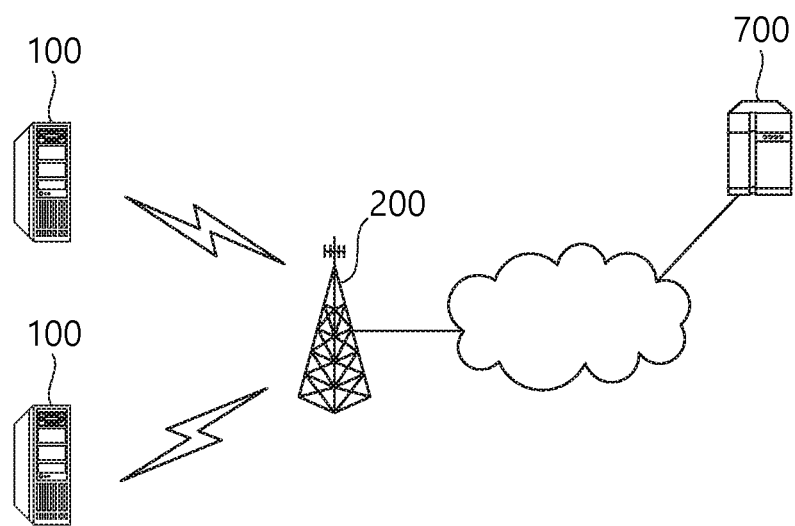
FIG. 4a shows an example of IoT (Internet of Things) communication.

FIG. 4a illustrates one example of Internet of Things (IoT) communication.

IoT refers to exchange of information through a base station 200 among IoT devices 100, which does not involve human interaction or exchange of information through the base station 200 between an IoT device 100 and a server 700. In this way, IoT is also called Cellular Internet of Things (CIoT) in that IoT communication employs a cellular base station.

IoT communication as described above is one type of Machine Type Communication (MTC). Therefore, an IoT device may also be called an MTC device.

IoT services may be distinguished from communication-based conventional services which require human intervention, including a wide range of services such as tracking, metering, payment, medical-care, and remote control. For example, IoT services may include meter reading, level measurement, use of surveillance cameras, reporting an inventory of a vending machine, and so on.

Since the amount of transmission data handled by IoT communication is small, and transmission and reception of uplink or downlink data occurs infrequently, it is preferable to lower the unit price of an IoT device 100 and to reduce battery consumption according to a low data transfer rate. Also, since an IoT device 100 has low mobility, channel conditions rarely change.

Figure 4B:
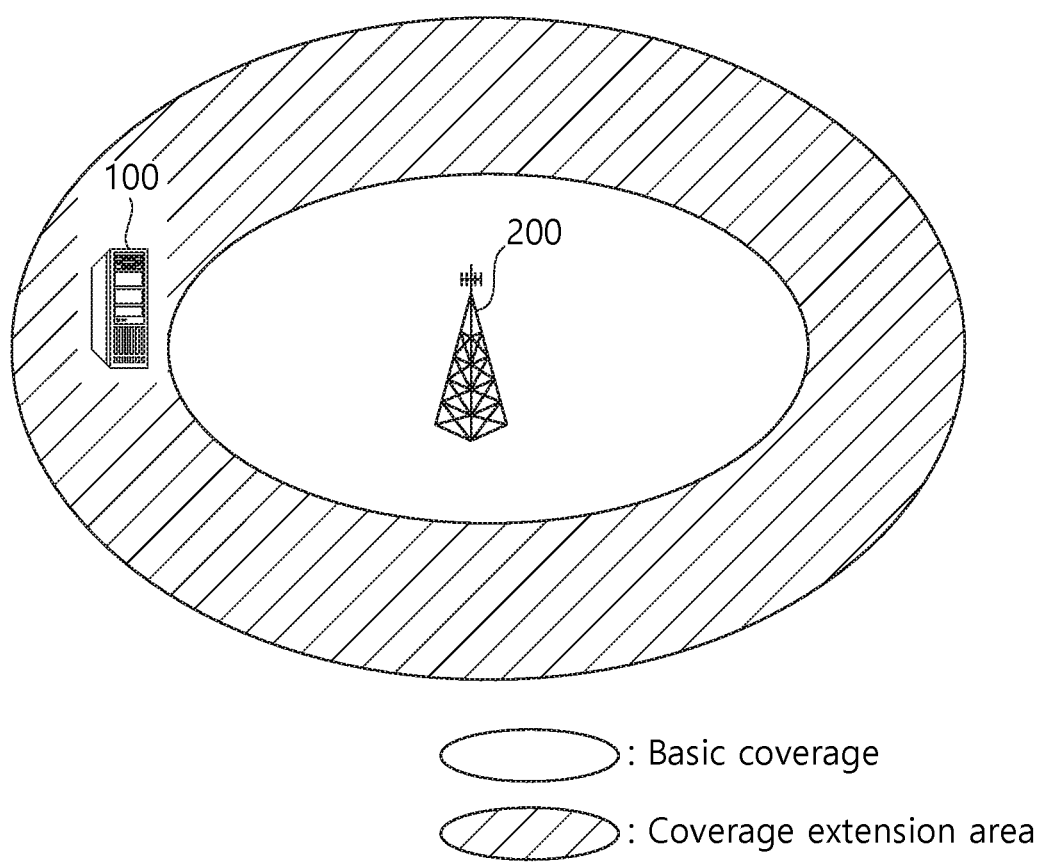
FIG. 4b is an example of cell coverage expansion or augmentation for an IoT device.

FIG. 4b illustrates cell coverage extension or enhancement for IoT devices.

Recently, cell coverage extension or enhancement of a base station to accommodate IoT devices 100 is being considered, and various techniques for extending or enhancing cell coverage are under discussion.

It should be noted, however, that when cell coverage is extended or enhanced, and a base station transmits a downlink channel to an IoT device located in the coverage extension (CE) area or coverage enhancement (CE) area, the IoT device encounters a difficulty in receiving the downlink channel.

To solve the problem above, a downlink channel or an uplink channel may be transmitted repeatedly on several subframes. In this way, transmission of an uplink/downlink channel repeatedly on several subframes is referred to as bundle transmission.

Figure 4C:
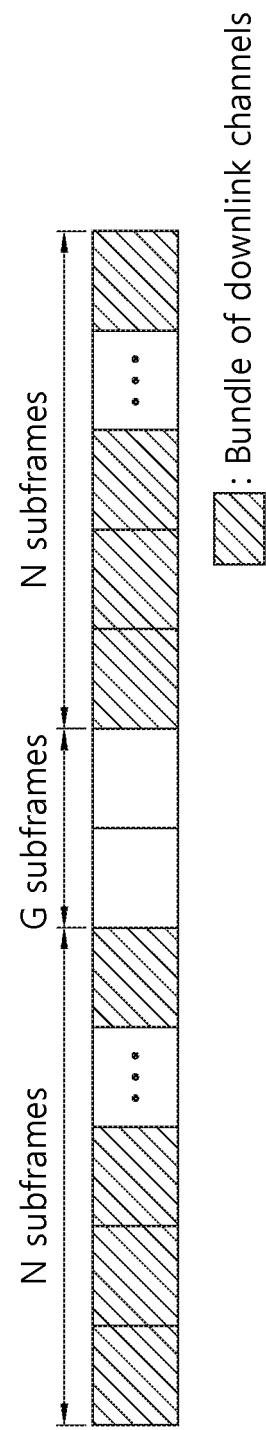
FIG. 4c is an example of transmission of a bundle of downlink channels.

FIG. 4c illustrates one example of transmitting a bundle of downlink channels.

As may be known from FIG. 4c, a base station transmits a downlink channel (for example, PDCCH and/or PDSCH) repeatedly to an IoT device 100 located in a coverage extension area on several subframes (for example, N subframes).

Then the IoT device or base station receives a bundle of downlink/uplink channels on several subframes and improves a decoding success rate by decoding the whole or part of the bundle.

Figure 5A:
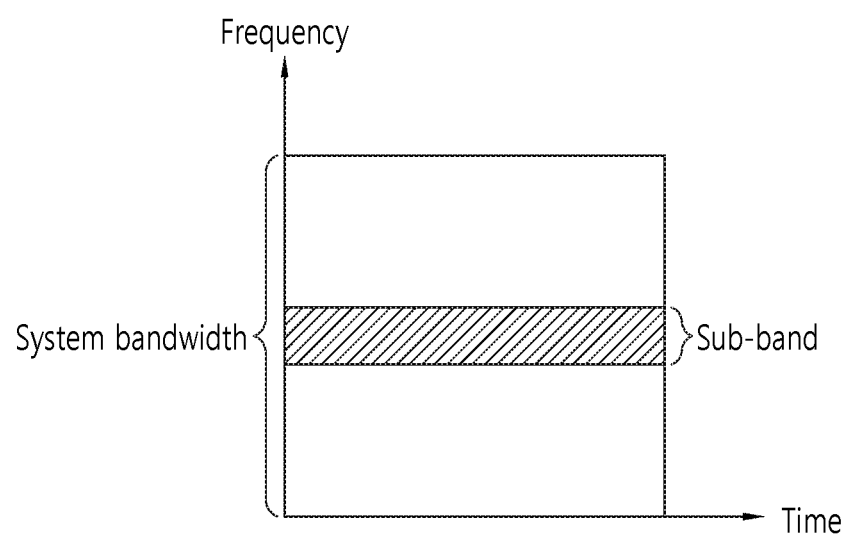
FIGS. 5a and 5b illustrate examples of subbands in which IoT devices operate.
Figure 5B:
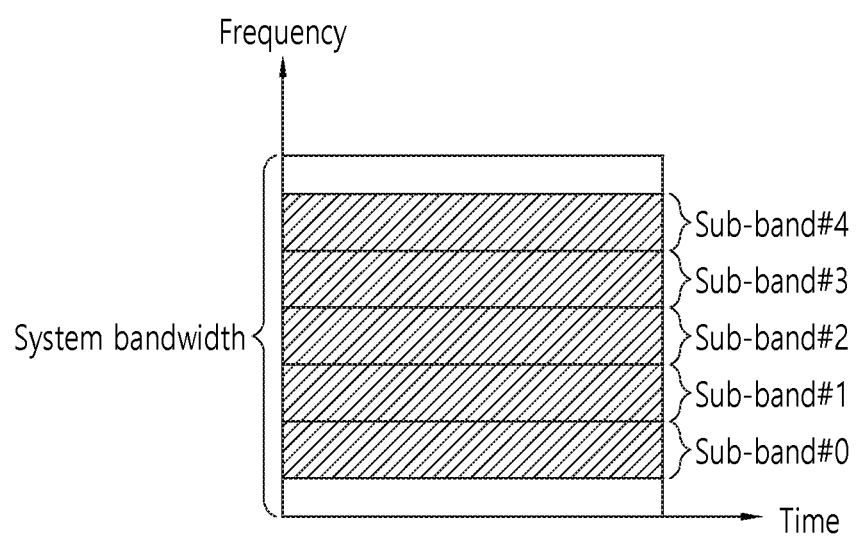

FIGS. 5a and 5b illustrate an example of a sub-band in which IoT devices operate.

As one solution for providing IoT devices at low cost, as shown in FIG. 5a, the IoT devices may use a sub-band of, for example, approximately 1.4 MHz independently of the system bandwidth of a cell.

At this time, as shown in FIG. 5a, the sub-band area in which the IoT devices operate may be located in the central area (for example, central six PRBs) of the system bandwidth of the cell.

Similarly, as shown in FIG. 5b, a plurality of sub-bands for IoT devices may be defined within one subframe for multiplexing of the IoT devices so that the IoT devices may use separate sub-bands. At this time, a majority of the IoT devices may use a different sub-band rather than the central area (for example, central six PRBs) of the system bandwidth of the cell.

As described above, the IoT communication operating with reduced bandwidth may be referred to as Narrow Band (NB) IoT communication or NB CIoT communication.

Figure 6:
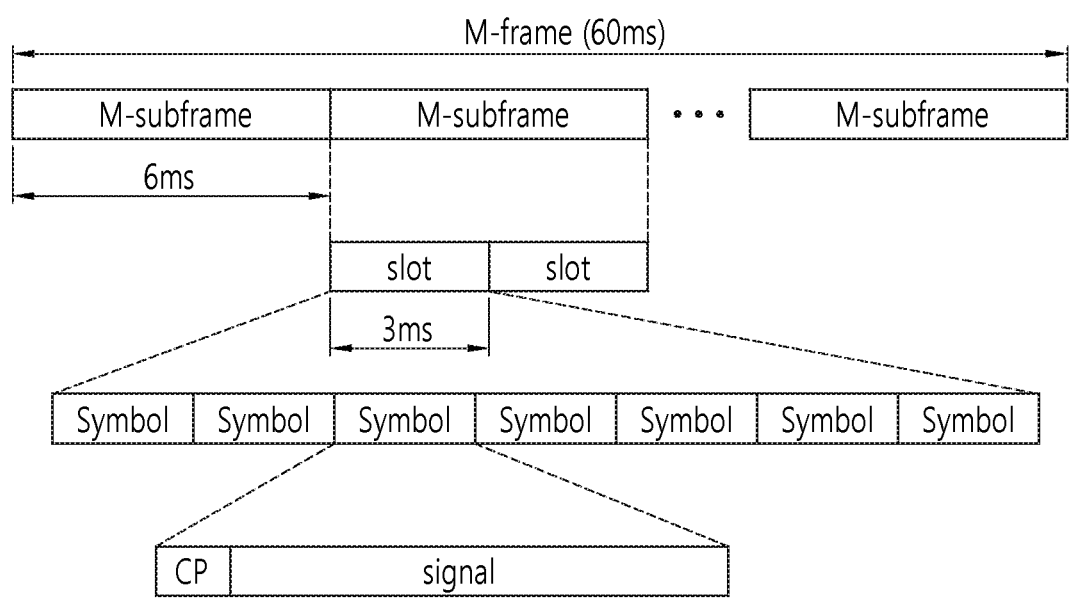
FIG. 6 shows an example of illustrating a time resource that may be used for NB-IoT as a M-frame basis.

FIG. 6 illustrates an example where time resources that may be used for NB-IoT are represented in units of M-frames.

Referring to FIG. 6, a frame which may be used for NB-IoT is called an M-frame, the length of which may be 60 ms, for example. Also, a subframe which may be used for NB IoT is called an M-subframe, the length of which may be 6 ms, for example. Therefore, an M-frame may comprise 10 M-subframes.

Each M-subframe may comprise two slots, and each slot may be 3 ms, for example.

However, different from what is shown in FIG. 6, a slot which may be used for NB IoT may have a length of 2 ms, a subframe may accordingly have a length of 4 ms, and a frame may have a length of 40 ms. Regarding this possibility, more details will be given with reference to FIG. 7.

Figure 7:
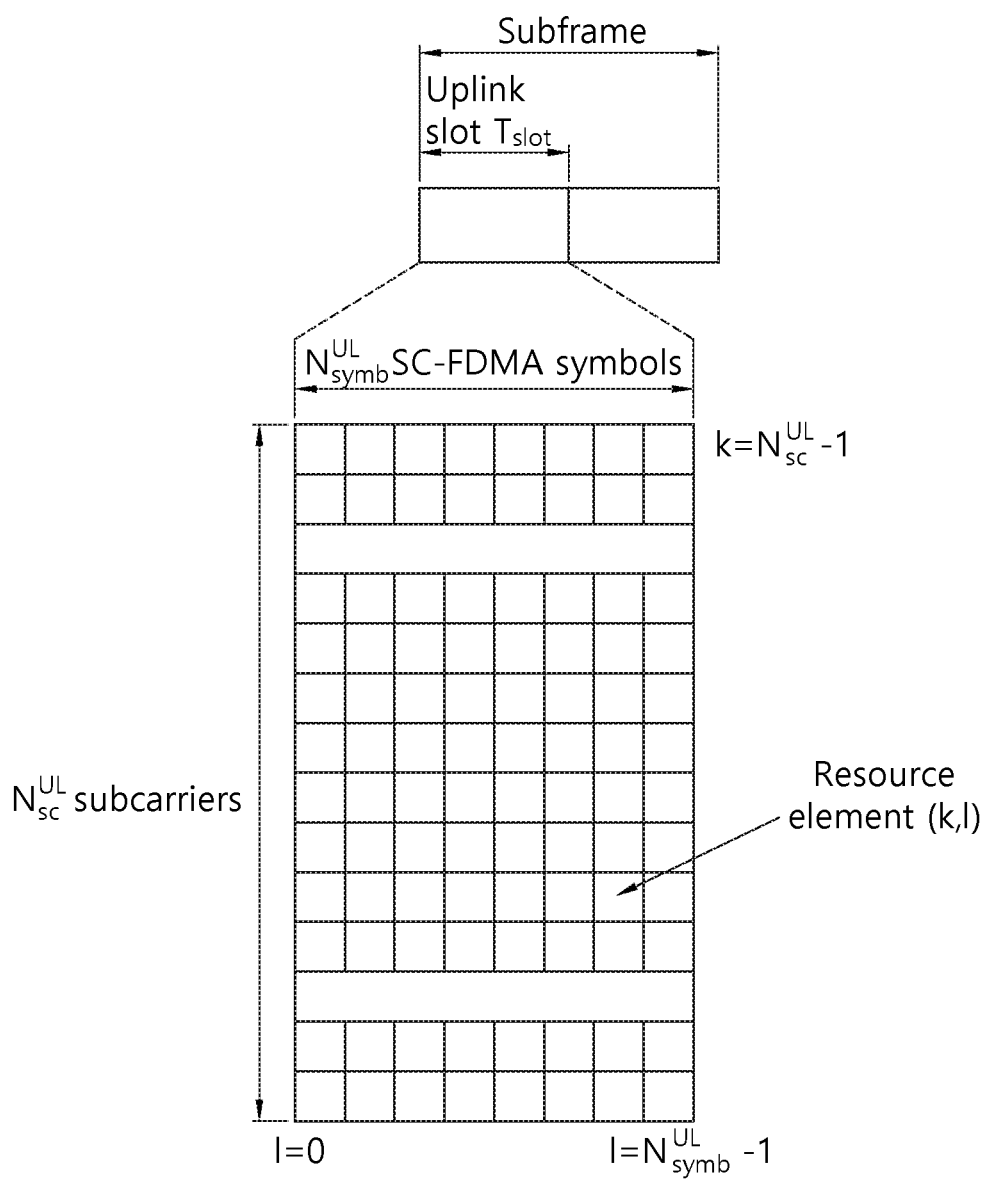
FIG. 7 shows another example of time and frequency resources that may be used for NB IoT.

FIG. 7 is another example illustrating time resources and frequency resources that may be used for NB IoT.

Referring to FIG. 7, a physical channel or physical signal transmitted on a slot from an uplink of NB-IoT includes $N_{symb}^{UL}$ SC-FDMA symbols in the time domain and $N_{SC}^{UL}$ subcarriers in the frequency domain. The uplink physical channel may be divided into a Narrowband Physical Uplink Shared Channel (NPUSCH) and a Narrowband Physical Random Access Channel (NPRACH). And a physical signal in the NB-IoT may become a Narrowband DeModulation Reference Signal (NDMRS).

The uplink bandwidths of $N_{SC}^{UL}$ subcarriers during $T_{slot}$ slots in the NB-IoT are as follows.

TABLE 3

| Subcarrier spacing | $N_{SC}^{UL}$ | $T_{slot}$ |
| --- | --- | --- |
| Δf = 3.75 kHz | 48 | 61440 * $T_s$ |
| Δf = 15 kHz | 12 | 15360 * $T_s$ |

In the NB-IoT, each resource element (RE) of a resource grid may be defined by an index pair (k, l) within a slot, where k=0, . . . , $N_{SC}^{UL}-1$, and l=0, . . . , $N_{symb}^{UL}-1$, specifying an index in the time and frequency domain, respectively.

In the NB-IoT, a downlink physical channel includes a Narrowband Physical Downlink Shared Channel (NPDSCH), Narrowband Physical Broadcast Channel (NPBCH), and Narrowband Physical Downlink Control Channel (NPDCCH). And a downlink physical signal includes a Narrowband reference signal (NRS), Narrowband synchronization signal (NSS), and Narrowband positioning reference signal (NPRS). The NSS includes a Narrowband primary synchronization signal (NPSS) and a Narrowband secondary synchronization signal (NSSS).

Meanwhile, NB-IoT is a communication scheme for wireless devices using bandwidth reduced to satisfy low-complexity/low-cost constraints (namely, narrowband). The NB-IoT is aimed to allow as many wireless devices as possible to be connected by using the reduced bandwidth. Moreover, the NB-IoT communication is aimed to support cell coverage larger than the cell coverage provided in the legacy LTE communication.

Meanwhile, as may be known from Table 1, when subcarrier spacing is 15 kHz, a carrier having the reduced bandwidth includes only one PRB. In other words, NB-IoT communication may be performed by using only one PRB. Here, a wireless device assumes that NPSS/NSSS/NPBCH/SIB-NB is transmitted from a base station, where a PRB connected to receive the NPSS/NSSS/NPBCH/SIB-NB may be called an anchor PRB (or anchor carrier). Meanwhile, in addition to the anchor PRB (or anchor carrier), the wireless device may receive additional PRBs from the base station. Here, among the additional PRBs, those PRBs not expected to receive the NPSS/NSSS/NPBCH/SIB-NB from the base station may be called a non-anchor PRB (or non-anchor carrier).

<Next-Generation Mobile Communication Network>

Due to the success of the long term evolution (LTE)/LTE-Advanced (LTE-A) for the fourth-generation mobile communication, a public interest in the next-generation (so-called 5G) mobile communication is growing, and researches into the next-generation mobile communication are conducted one after another.

The 5-th generation mobile communication, as defined by the International Telecommunication Union (ITU), refers to the technology aimed to provide a data transfer speed of up to 20 Gbps and an effective transfer speed faster than at least 100 Mbps everywhere. The official name of the 5-th generation mobile communication is 'IMT-2020', which is due to be commercialized by 2020 worldwide.

The ITU proposed three use case scenarios: enhanced Mobile BroadBand (eMBB), massive Machine Type Communication (mMTC), Ultra Reliable and Low Latency Communication (URLLC).

URLLC is related to a use scenario which requires high reliability and low latency. For example, such services as automated driving, factory automation, and augmented reality require high reliability and low latency (for example, latency less than 1 ms). The latency of the current 4G (LTE) technology is statistically 21-43 ms (best 10%) and 33-75 ms (median). This specification is not sufficient to support services requiring latency less than 1 ms. The eMBB described next is related to a use scenario requiring a mobile ultra-wideband.

In other words, the 5-th generation mobile communication system targets to provide a capacity higher than that of the current 4G LTE, improve density of mobile broadband users, and support high reliability and Machine Type Communication (MTC). 5G R&Ds also target lower latency and lower battery consumption than provided by the 4G mobile communication system to implement the Internet of things more efficiently. To realize the 5G mobile communication as described above, a new radio access technology (New RAT or NR) may be proposed.

In the NR, it may be taken into consideration that reception from a base station may use downlink subframes, and transmission to the base station may use uplink subframes. This scheme may be applied to paired spectra and unpaired spectra. One pair of spectra indicates that two carrier spectra are involved for downlink and uplink operations. For example, in one pair of spectra, one carrier may include a downlink and uplink bands forming a pair with each other.

Figure 8:
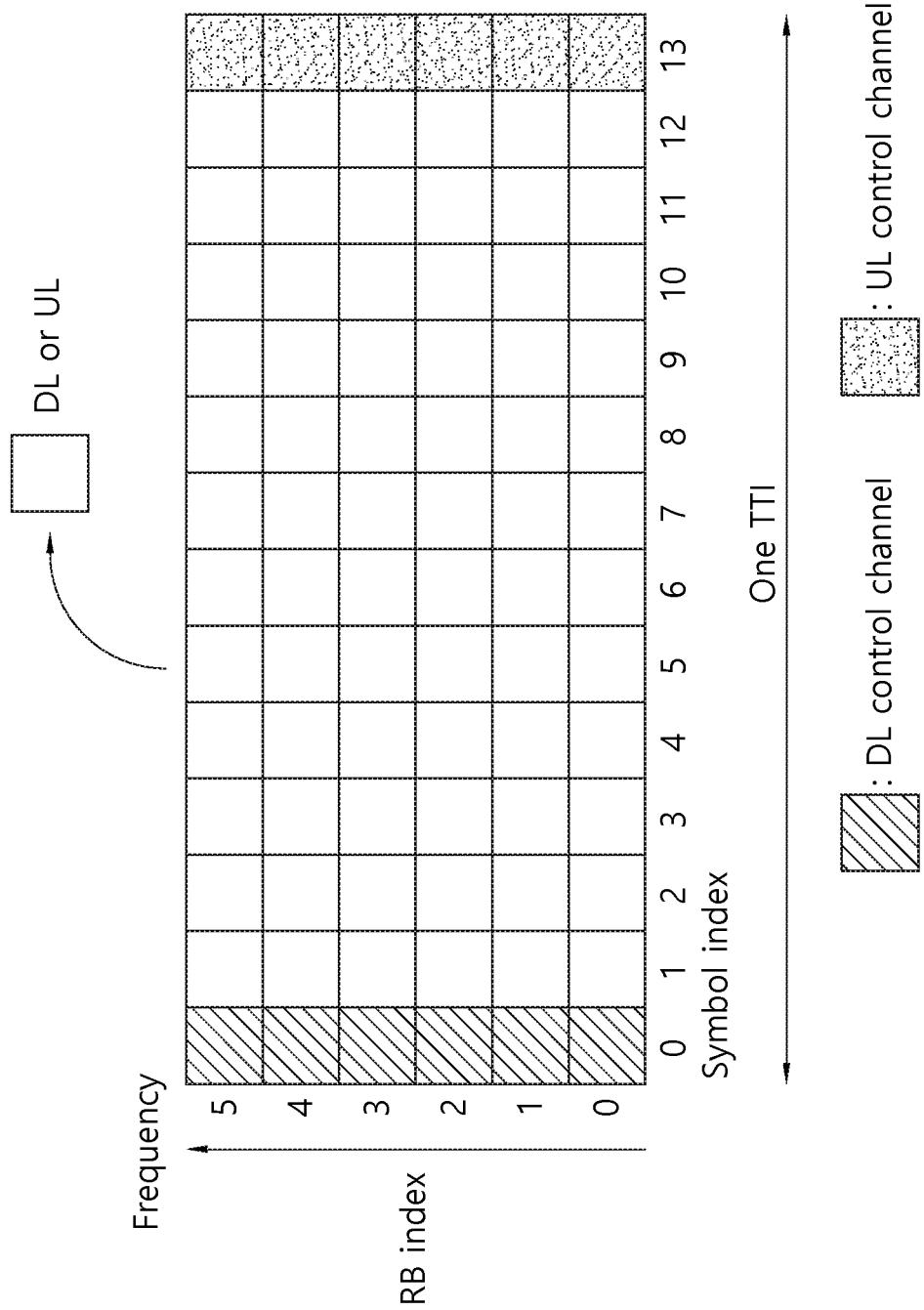
FIG. 8 shows an example of a subframe type in NR.

FIG. 8 illustrates an example of subframe type in the NR.

The transmission time interval (TTI) shown in FIG. 8 may be called a subframe or a slot for the NR (or new RAT). The subframe (or slot) of FIG. 8 may be used in the TDD system of NR (or new RAT) to minimize data transfer latency. As shown in FIG. 8, a subframe (or slot) comprises 14 symbols in the same way as the current subframe. The leading symbol of a subframe (or slot) may be used for DL control channel, and the trailing symbol of the subframe (or slot) may be used for UL control channel. The remaining symbols may be used for DL data transmission or UL data transmission. According to the aforementioned subframe (or slot) structure, downlink transmission and uplink transmission may be carried out sequentially in one subframe (or slot). Therefore, downlink data may be received within the subframe (or slot), or an uplink acknowledgement response (ACK/NACK) may also be transmitted within the subframe (or slot). The structure of the subframe (or slot) as described above may be referred to as a self-contained subframe (or slot). When this subframe (or slot) structure is used, time required to retransmit data which has caused a reception error is reduced, leading to minimization of final data transmission waiting time. In the self-contained subframe (or slot) structure, however, a time gap may be needed for a transitioning process from a transmission mode to a reception more or vice versa. To this end, part of OFDM symbols employed for transitioning from DL to UL transmission in the subframe structure may be designated as a guard period (GP).

<Support of Various Numerologies>

In the next-generation system, according to the advances in the wireless communication technology, a plurality of numerologies may be provided for a UE.

The numerology may be defined by the length of cyclic prefix (CP) and subcarrier spacing. A single cell may provide a plurality of numerologies to a UE. If the index of numerology is represented by $\mu$, each subcarrier spacing and the corresponding CP length may be given as follows.

TABLE 4

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of normal CP, if the numerology index is represented by $\mu$, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 5

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of extended CP, if the numerology index is represented by $\mu$, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 6

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Meanwhile, in the next-generation mobile communication, each symbol within a slot may be used as a downlink or an uplink as shown in the table below. In the table below, the uplink is denoted by U while the downlink is denoted by D. In the table below, X represents a symbol which may be used flexibly as an uplink or a downlink.

TABLE 7

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |

TABLE 7-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | X | X | X | U | U |
| 31 | D | D | D | D | D | D | D | D | D | X | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | U | U |
| 45 | D | D | D | D | D | X | U | U | U | U | U | U | U | U |
| 46 | D | D | D | D | D | X | D | D | D | D | D | D | D | X |
| 47 | D | D | D | D | X | X | D | D | D | D | D | X | X | X |
| 48 | D | X | X | X | X | X | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | X | U |
| 61 | D | D | X | X | X | U | D | D | X | X | X | U | X | U |

<Content of Present Disclosure>

The present disclosure presents approaches to transmit and receive RS (reference signal) on a special subframe to support NB-IoT (Narrowband Internet of Things) operating in TDD (Time-Division Duplexing).

NB-IoT may operate in any one of the following three operation modes. The three operation modes may include a guard band operation mode, a stand-alone operation mode, and an in-band operation mode. The base station configures the operation mode and then transmits the mode to the user equipment (for example, NB-IoT device) via a higher layer signal, for example, a master information block (MIB) and a system information block (SIB).

The in-band operation mode means that the NB-IoT cell operates in a portion within a band where the first LTE cell operates. The in-band operation mode may be divided into In-band-same PCI mode in which the NB-IoT cell and the LTE cell share the same physical cell ID (hereinafter referred to as PCI) and the in-band different PCI in which the NB-IoT cell and the LTE cell use different PCIs.

In the in-band same PCI mode, the number of NRS and the number of CRS are the same.

The guard band operation mode is defined as a guard band in the LTE band and means that the NB-IoT cell uses a band portion which the LTE cell does not use. For example, the NB-IoT cell may operate on a guard band that exists between a first band in which the first LTE cell operates and a second band in which a second LTE cell operates.

The stand-alone operation mode means that an NB-IoT cell operates on a band in which a non-LTTE cell operates. For example, an NB-IoT cell may operate using a portion of a band where a GSM cell operates.

Hereinafter, in the present disclosure, when the size of the subcarrier spacing (SS) used in the NB-IoT uplink (UL) performing the TDD operation is smaller than 15 kHz, operations required for UL transmission (i.e. transmission of the NPUSCH) is suggested.

In NB-IoT, 15 kHz and 3.75 kHz are used as subcarrier spacing (SCS) for UL transmission in FDD operation. Especially, 3.75 kHz subcarrier spacing (SCS) is suggested for single-tone transmission using only one subcarrier. Thus, when 3.75 kHz subcarrier spacing (SCS) is used, it is defined to use 2 ms as an NB-slot to match the subframe boundaries between 3.75 kHz and 15 kHz.

In the case of TDD, depending on the UL/DL configuration, the number of contiguous UL subframes may be limited.

Figure 9:
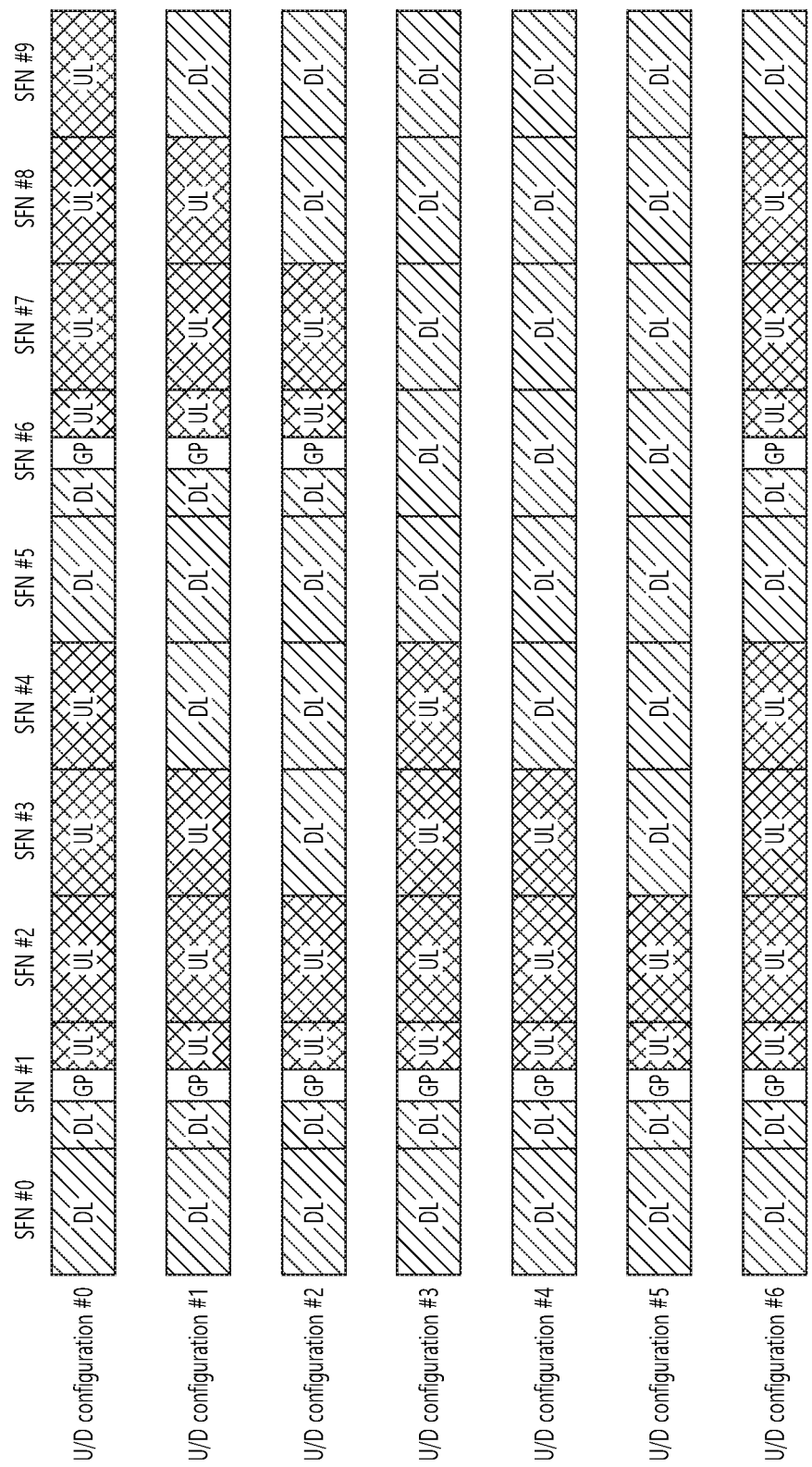
FIG. 9 shows an example of UL/DL configurations available in TDD.

FIG. 9 shows an example of UL/DL configurations available in TDD.

As shown, for example, in the case of UL/DL configuration #0, the number of contiguous UL subframes is limited to three; for UL/DL configuration #1, the number of contiguous UL subframes is limited to two; and for UL/DL configuration #2, the number of contiguous UL subframes is limited to one.

One UL subframe has a size of 1 ms. Therefore, if the number of contiguous UL subframes is 1 (for example, UL/DL configuration #3, UL/DL configuration #5), the NB-slot structure of the FDD requiring a length of 2 ms may not be suitable. Also, even when the number of contiguous UL subframes is two or more, it may happen that the NB-slot defined in the FDD cannot be configured depending on the starting subframe position of the starting NB-slot. For example, in the case of UL/DL configuration #1, the number of contiguous UL subframes is 2. However, when transmission of NB-slots is configured in SFN (subframe number) #3, FDD NB-slot structure cannot be constructed.

The present disclosure suggests approaches to support subcarrier spacing (SCS) smaller than 15 kHz in NB-IoT performing TDD operation to solve the above mentioned problems.

Hereinafter, operations for supporting the NB-IoT using the TDD mode in the LTE system are mainly described. However, the following description may be applied to a system having a TDD structure and supporting two or more different subcarrier spacing (SCS).

In the following description, a subcarrier spacing (SCS) unit smaller than a reference subcarrier spacing (SCS) unit for determining a subframe boundary may be defined as reduced subcarrier spacing (RSS). For example, in NB-IoT on LTE systems, the reference subcarrier spacing (SCS) may be LTE-based 15 kHz subcarrier spacing (SCS), while RSS may be 3.75 kHz and/or 7.5 kHz subcarrier spacing (SCS) allocated to NB-IoT user equipment.

Figure 10:
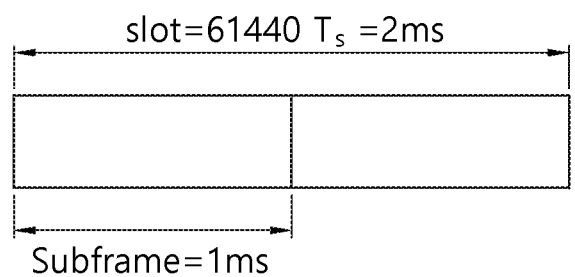
FIG. 10 shows an example of a slot of a 3.75 kHz subcarrier spacing for TDD.

FIG. 10 shows an example of a slot of a 3.75 kHz subcarrier spacing for TDD.

As may be seen with reference to FIG. 10, a slot based on RSS (i.e., 3.75 kHz subcarrier spacing) may be 2 ms long. Accordingly, two subframes each having a length of 1 ms may be included in the slot.

I. First Suggestion: Approach to Determine Whether to Support RSS-Based Slot According to UL/DL Configuration This suggestion suggests how to determine whether to support a RSS-based slot according to UL/DL configuration. At this time, the selected UL/DL configuration may be selected based on a condition that a length of the contiguous UL subframe satisfies one slot length (for example, a unit composed of 7 symbols) when a target RSS is used. For example, if RSS is 3.75 kHz, the UL/DL configuration supporting 3.75 kHz may be selected from cases (for example, UL/DL configurations #0, #1, #3, #4, and #6) when the length of the contiguous UL subframes is larger than 2 ms.

I-1. An Approach that Determines Whether UL Transmission (i.e., Transmission of NPUSCH) is Allowed on an RSS-Based Slot According to the SFN When the first suggestion is used, this may additionally consider whether UL transmission (i.e., transmission of NPUSCH) is allowed on the RSS-based slot at the subframe position according to the SFN at which UL transmission (i.e., transmission of NPUSCH) starts. In one specific method, the UL transmission may be performed on the RSS-based slot only if the available contiguous subframes are continuous from the subframe where the UL transmission (i.e., transmission of the NPUSCH) is initiated. Specifically, when RSS is 3.75 kHz, and when any subframe and a subsequent contiguous subframe are available for UL transmission (i.e. transmission of NPUSCH), the corresponding any subframe may be defined as the starting subframe. For example, the position of an SFN where the UL transmission (i.e., transmission of an NPUSCH) starts on a 3.75 kHz based slot in accordance with the UL/DL configuration may follow a table below.

TABLE 8

| UL/DL configuration | SFN |
| --- | --- |
| 0 | #2, #3, #7, #8 |
| 1 | #2, #7 |
| 3 | #2, #3 |
| 4 | #2 |
| 6 | #2, #3, #7 |

In the above table, although the start position of UL transmission (that is, transmission of NPUSCH) satisfies the following SFN, and when an immediately subsequent contiguous UL subframe is not used for UL transmission (that is, transmission of NPUSCH) in a specific situation, the subframe cannot be used for UL transmission (that is, transmission of NPUSCH). For example, if one of two contiguous subframes contained in an RSS-based slot is determined as an invalid UL subframe by the base station, the UL transmission (that is, transmission of NPUSCH) may be prohibited at the position corresponding to the subframe. In this connection, the invalid UL subframe means a subframe that is not usable for UL transmission (that is, transmission of NPUSCH). For example, the invalid UL subframe may be configured for NPRACH purposes, or for other purposes than NB-IoT. Also, even when the corresponding subframe is a valid UL subframe (that is, a subframe usable for NPUSCH transmission in the NB-IoT), and when the corresponding subframe is a subframe configured only for subcarrier spacing (SCS) (for example, 15 kHz) other than RSS, UL transmission (that is, transmission of NPUSCH) may be prohibited at the position corresponding to the subframe.

The suggested I-1 approach may be used to determine the position at which UL transmission (that is, transmission of the NPUSCH) begins on the RSS-based slot. Also, when the transmission block is configured to include one or more subframes, or UL transmission (that is, transmission of NPUSCH) is repeated on a plurality of subframes, this approach may be used to determine the subframe used for UL transmission. If a position (candidate) that can be selected as the starting subframe is fixed via the approach I-1, a specific approach by which the user equipment determines the starting subframe may use one of the following options. The following options may be applied to all subcarrier spacing (SCS) used in the system. In this case, different options may be applied to the subcarrier spacings (SCS).

Option I-1-1.

If the scheduling delay for UL transmission (that is, transmission of NPUSCH) is specified via DCI, the scheduling delay calculation may be based on the number of all UL subframes. This may also be intended of allowing the base station to flexibly specify the scheduling delay. For example, if the interpretation of the scheduling delay of NPUSCH Format 1 indicated by the DCI including the UL grant is k0, the user equipment may initiate transmission of NPUSCH Format 1 after k0 UL subframes from the corresponding UL grant. In another example, if the interpretation of the scheduling delay of NPUSCH Format 2 received from the DL grant is k, the user equipment may initiate transmission of NPUSCH Format 2 after k0 UL subframes from a last transmission subframe of the associated NPDSCH.

Option I-1-2.

If the scheduling delay for UL transmission (that is, transmission of NPUSCH) is specified via DCI, the calculation of the scheduling delay may be calculated based only on the UL valid subframe. This may be intended such that if there is a definition of a UL valid subframe, the scheduling to a position where transmission is not possible is prevented. For example, if the interpretation of the scheduling delay of NPUSCH format 1 received from the UL grant is k0, the user equipment may initiate NPUSCH format 1 transmission after k0 UL valid subframes from the corresponding UL grant. In another example, if the interpretation of the scheduling delay of NPUSCH Format 2 received from the DL grant is k0, the user equipment may initiate transmission of NPUSCH Format 2 after k0 UL valid subframes from the last transmission subframe of the associated NPDSCH.

Option I-1-3.

If the scheduling delay for the specified UL transmission (that is, transmission of NPUSCH) is specified via the DCI, the scheduling delay may be calculated on a bundle of contiguous UL subframes basis. For example, for the U/D configuration #2, subframes #2 and #3 may be configured as one bundle and subframes #7 and #8 may be configured as one bundle. In case of U/D configuration #3, subframes #2, #3 and #4 may be configured as one bundle. For U/D configuration #4, subframes #2 and #3 may be configured as one bundle. Subframes #2, #3, and #4 may be configured as one bundle and subframes #7 and #8 may be configured as one bundle in the case of U/D configuration #6. In the case of a U/D configuration with one contiguous UL subframe, each UL subframe may be configured as one bundle. For example, when the interpretation of the scheduling delay of NPUSCH format 1 received from the UL grant is k0, the user equipment may initiate an NPUSCH format 1 transmission after the bundle of k0 contiguous UL subframes from the corresponding UL grant. In another example, if the interpretation of the scheduling delay of NPUSCH Format 2 received from the DL grant is k0, the user equipment may initiate transmission of NPUSCH Format 2 after a bundle of k0 contiguous UL subframes from the last transmission subframe of the associated NPDSCH.

Option I-1-4.

If the scheduling delay for the specified UL transmission (that is, transmission of NPUSCH) is specified via the DCI, the calculation of the scheduling delay may be performed based on the number of RF frames. If there is one or more starting subframe available in an RF frame, an additional DCI field may be used to specify this. In this connection, since the available UL start subframe depends on the U/D configuration, a method of interpreting the DCI field may vary depending on the U/D configuration. For example, if the interpretation of the scheduling delay of NPUSCH format 1 received from the UL grant is k0 RF frames and k1 UL subframes, the user equipment may initiate transmission of the NPUSCH format 1 in the k1-th UL subframe after k0 RF frames from the corresponding UL grant. In another example, if the interpretation of the scheduling delay of NPUSCH Format 2 received from the DL grant is k0 RF frames and k1 UL subframes, the user equipment may initiate transmission of NPUSCH Format 2 in the k1-th UL subframe after k0 RF frames from the last transmission subframe of the associated NPDSCH.

If the starting subframe to be used as determined by the options is not a usable subframe based on the condition of the I-1, the UL signal to be transmitted at the corresponding position may be transmitted according to either implementation 1) or implementation 2) below.

Implementation 1): Corresponding UL data transmission may be postponed to the next transmission-available position. This may be to satisfy the target code rate of the transmission block to be transmitted.

Implementation 2): Corresponding UL data may be punctured without being transmitted. This may be to reduce the overall transmission time via latency reduction.

If the repetition level of the corresponding UL transmission (that is, transmission of the NPUSCH) is $R_p$ or smaller even when the implementation 2) is applied, the UL data transmission may be postponed instead of puncturing the corresponding UL data. This may be because, below a specific repetition level, the puncturing may significantly reduce the decoding reliability.

I-2. An Approach to Specify Scheduling Block in U/D Configurations #3, #6

If the first suggestion is used and the U/D configurations #3 and #6 are used, the use of the specific RSS may limit the scheduling of transmissions using a different subcarrier spacing (SCS). For example, if 3.75 kHz subcarrier spacing (SCS) is used, 2 ms long contiguous UL subframes are required to transmit one slot. In case of U/D configuration #3 and #6 in which three contiguous UL subframes are present in terms of the structure of the U/D configuration, one UL subframe may be left. In this connection, if there is no slot structure where 3.75 kHz subcarrier spacing (SCS) may support one UL subframe, and if a different subcarrier spacing (SCS) does not use one UL subframe, resource waste may occur.

In order to solve this problem, Section I-2 suggests a method by which a scheduling block is designated and the UE configures that UL transmission (that is, transmission of NPUSCH) is enabled only via the designated scheduling block.

Figure 11A:
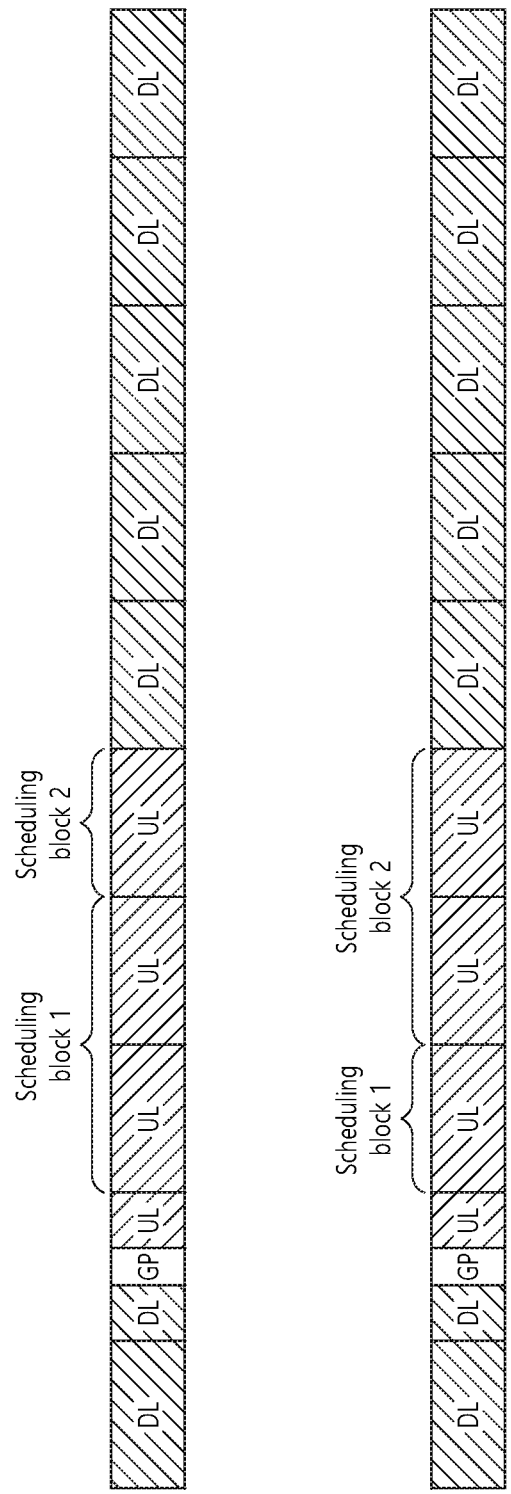
FIG. 11a and FIG. 11b show examples of configurable scheduling blocks in U/D configuration #3 and U/D configuration #6, respectively.
Figure 11B:
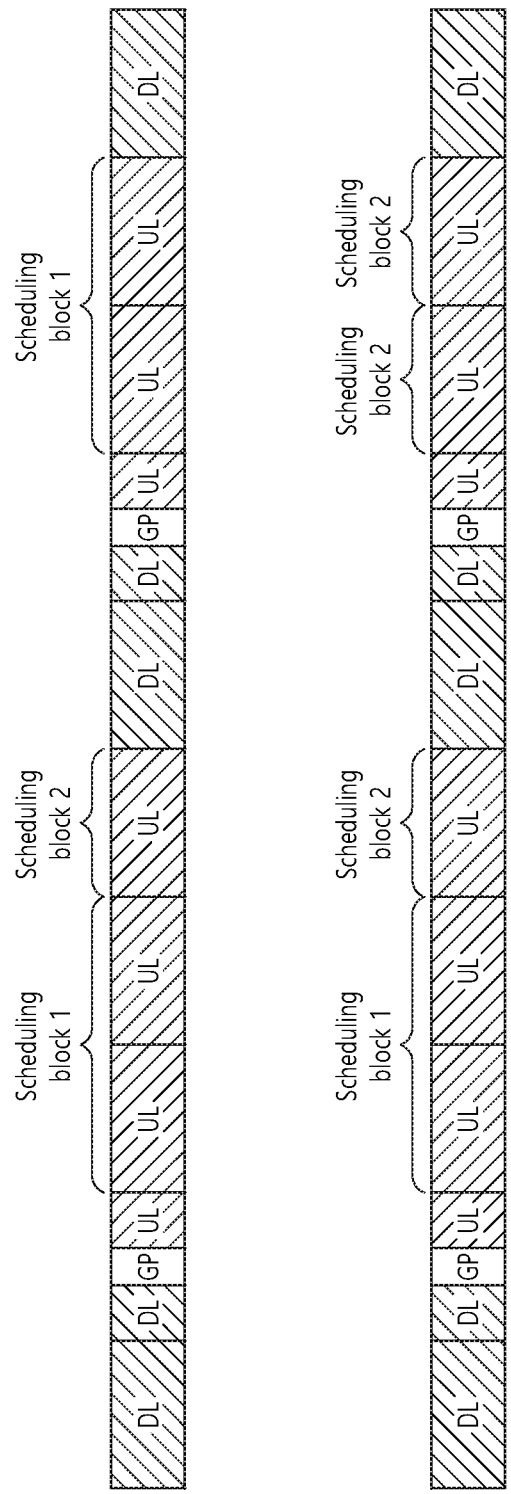

FIG. 11a and FIG. 11b show examples of configurable scheduling blocks in U/D configuration #3 and U/D configuration #6, respectively.

The scheduling block is defined as a combination of L contiguous UL subframes. In a structure such as U/D configurations #3 and #6 using 3.75 kHz subcarrier spacing (SCS), the size of L may be 1 or 2.

The user equipment may perform UL transmission (that is, transmission of NPUSCH) only via the scheduling block configured from the base station. For example, the user equipment assigned a scheduling block 1 may not use a scheduling block 2 for UL data purposes, may skip the same and vice versa. In this connection, it may be configured such that the interpretation of the scheduling delay is calculated only based on the scheduling block used for transmission by the UE.

The scheduling block is configured by the base station. Corresponding configuration information may be communicated to the user equipment. For this purpose, higher layer signals such as SIB or RRC signals may be used. Alternatively, the corresponding configuration information may be delivered dynamically via the DCI.

The index of the scheduling block to be used by the user equipment may be configured by the base station or may be used via combination of one or more of the following options.

Option I-2-1.

The index of the scheduling block to be used by the user equipment may be determined by the size of the subcarrier spacing (SCS). For example, a user equipment using 3.75 kHz subcarrier spacing (SCS) may be configured to use a scheduling block composed of two UL subframes. This has an advantage that because the available scheduling blocks are limited for the specific RSS, the scheduling block may be configured without any additional signaling overhead. As another example, if 15 kHz subcarrier spacing (SCS) is used and the repetition level is smaller than or equal to $R_s$, the user equipment may be configured to use a scheduling block composed of one UL subframe. This may be aimed at configuring the scheduling block without additional signaling overhead when the UL transmission (that is, transmission of NPUSCH) is allowed in one UL subframe and when a sensitivity to delay is low due to a low repetition level.

Option I-2-2.

The index of the scheduling block to be used by the user equipment may be configured in a semi-static manner via the higher layer signal in the RRC connection configuration operation. This may be aimed at maintaining the low overhead while ensuring flexibility in the use of the scheduling block.

Option I-2-3.

The index of the scheduling block to be used by the user equipment may be dynamically determined via the DCI. This has the advantage that the scheduling flexibility of the user equipment may be obtained at a maximum level.

Option I-2-4.

The index of the scheduling block to be used by the user equipment may be specified via a second message (called MSG2), that is, a RAR (Random Access Response) message in the random access procedure. This may have a purpose of determining the index of the scheduling block to be used in a third message of the random access procedure (called MSG3). Further, this may also have a purpose of enabling the same scheduling block to be used without further signaling even in the RRC connected state.

Option I-2-5.

If a separate configuration for a scheduling block index for the user equipment is absent (or has expired), the index of the scheduling block that may be used by default may be determined by a higher layer signal such as SIB or RRC signaling.

Option I-2-6. For the user equipment, one or more scheduling block indexes may be simultaneously configured. For example, if the user equipment performs UL transmission (that is, transmission of NPUSCH) using 15 kHz subcarrier spacing (SCS), the user equipment may be configured to use both a scheduling block with two UL subframes and a scheduling block with one UL subframe.

The scheme using the scheduling block as suggested as above may be generally applied to other U/D configurations. This may have a purpose of preparing for a case where in a situation, such as, in enhanced interference mitigation and traffic adaptation (eIMTA) where the U/D configuration of a serving cell or neighboring cell may change dynamically, the UL subframe may be changed to the DL subframe to interfere with the DL reception by another UE, or a portion of the transmission of the UL transmission (that is, NPUSCH) thereof is not properly transmitted to the base station. For example, in the case of U/D configuration #2 and #4, there are two contiguous UL subframes, and each UL subframe may be defined as a respective scheduling block. Alternatively, for the U/D configurations #3 and #6, the method may define a scheduling block of a subframe unit to prevent the eIMTA-enabled effect via scheduling at a higher degree of freedom, in addition to the examples shown in FIG. 10a and FIG. 10b.

Option I-2-7.

If the user equipment is configured to use at least one scheduling block, transmission powers of the scheduling blocks may be configured differently. In this connection, information about the configuration of the transmission power may be transmitted to user equipment via higher layer signals such as SIB or RRC signals, or dynamically transmitted via DCI.

Option I-2-8.

If the user equipment is configured to use at least one scheduling block via a signal such as SIB or RRC signal, the UE may also determine which scheduling block to use via DCI.

II. Second Suggestion: Approach to Construct Slot Structure to Support RSS

This suggestion suggests an approach to construct a slot structure according to transmission situation when the UL transmission (that is, transmission of NPUSCH) based on RSS is used. In this connection, the slot refers to a transmission unit composed of a collection of one or more symbols. The suggested approach may be used in combination with one or more of the following approaches II-1, II-2, and II-3.

II-1. Approach to Construct Short Slot in Order to Support RSS

In this section, the present suggestion proposes an approach to construct a short slot in RSS-based UL transmission (that is, transmission of NPUSCH). In this connection, a short slot means a transmission unit composed of six symbols or smaller. A duration of the short slot may be defined as a duration of a single subframe based on a reference subcarrier spacing (SCS) for determining a subframe boundary. For example, if the reference subcarrier spacing (SCS) that determines the subframe boundary is 15 kHz, the duration of the short slot may be configured to be 1 ms.

If a sum of the durations of the symbols constituting the short slot is shorter than a duration of a single subframe based on the reference subcarrier spacing (SCS) that determines the reference subframe boundary, a signal may be transmitted on symbols other than symbols constituting a short slot among symbols of a legacy LTE reference subframe to prevent waste of transmission power and to prevent collision with SRS of the legacy LTE system. In this connection, a start boundary of the short slot may be configured to match a boundary of a single subframe based on the reference subcarrier spacing (SCS), which determines the reference subframe boundary. Alternatively, the specific symbol (s) may be extended to reduce the phase shift at the boundary between the short slots, such that the duration thereof may match a duration of a single subframe based on the reference subcarrier spacing (SCS), which determines the reference subframe boundary. This may also have the purpose of enhancing the effect of lowering the Peak-to-Average Power Radio (PAPR) when a phase-rotated modulation (for example, pi/2-BPSK or pi/4-QPSK) technique is employed for reducing the phase difference between two symbols and thus lowering the Peak-to-Average Power Radio (PAPR).

For example, when the reference subcarrier spacing (SCS) determining the subframe boundary is 15 kHz and the RSS is 3.75 kHz, the short slot may be configured to be composed of three symbols. In this connection, a duration of one symbol for 3.75 kHz is about 4 times larger than a duration of one symbol for 15 kHz. Further, when a CP length is 256/(15000×2048) sec, the number of symbols that may fall within a 1 ms duration is preferably three.

Further, (SCS) short slot may contain one DMRS symbol. In this connection, the position of the DMRS may be configured to be the second symbol in the short slot.

Figure 12:
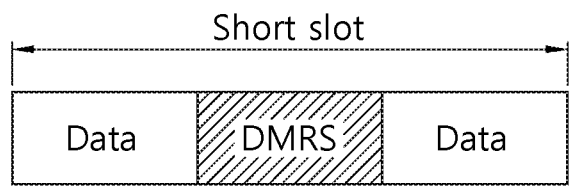
FIG. 12 is an illustration showing an example of a short slot.

FIG. 12 shows an example of a short slot.

Referring to FIG. 12, an example of a short slot structure in which the second symbol therein is used as the DMRS symbol is illustrated.

If there are contiguous short slots in a system using a short slot structure, the DMRS may only be included in some short slots among contiguous short slots. This may have the purpose of increasing the transmission rate by reducing the density of the DMRS in a situation where the channel is not largely changed. For example, when there are three contiguous UL subframes, as in UL/DL configuration #0, and when both of these UL subframes are available for the purpose of a short slot, only one of these three short slots, or only two short slots among them may contain a DMRS. In this connection, if one DMRS is contained, only the second short slot among the three short slots may contain the DMRS. In this connection, if two DMRSs are included, the first and third short slots among the three short slots may contain the DMRS.

Figure 13:
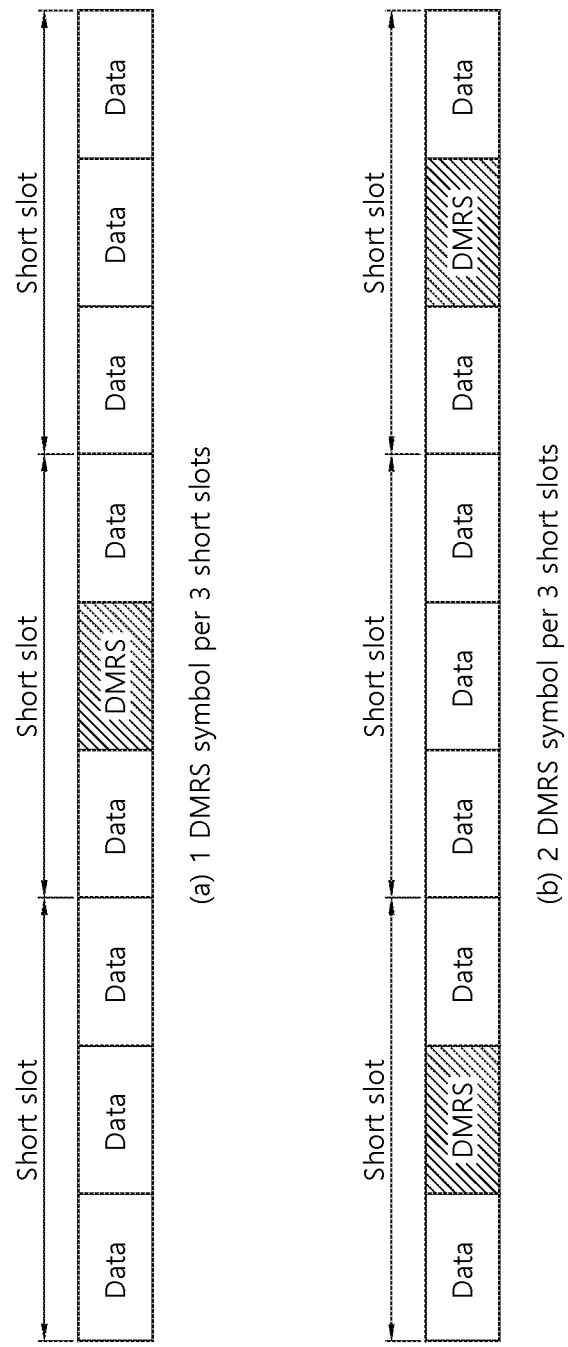
FIG. 13 is a diagram illustrating first examples of a short slot including a DMRS symbol.
Figure 14:
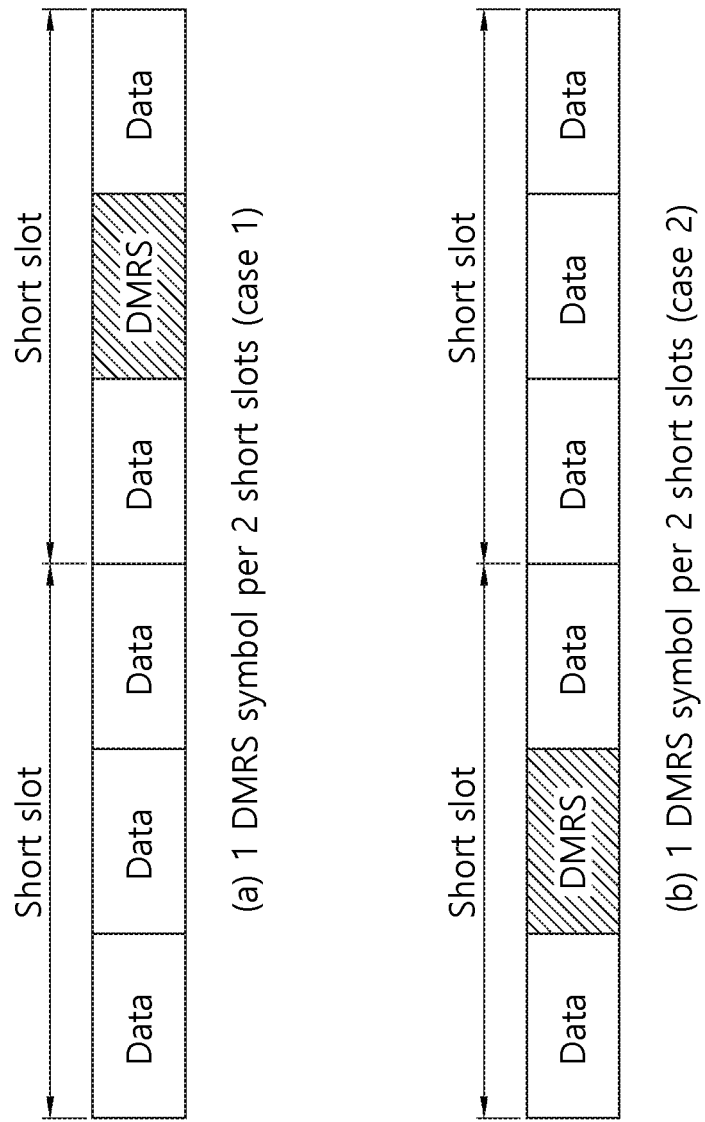
FIG. 14 is a view showing second examples of a short slot including a DMRS symbol.

FIG. 13 is an illustration showing first examples of a short slot including a DMRS symbol. FIG. 14 is an illustration showing second examples of a short slot including a DMRS symbol.

As may be seen with reference to FIG. 13, if three contiguous slots are configured as short slots, only some short slots may contain DRMS.

FIG. 13(a) shows an example with one DMRS symbol. FIG. 13(b) shows an example where there are two DMRS symbols. In another example, if there are two contiguous UL subframes, for example, as in UL/DL configuration #1, and if all of the two UL subframes are available as short slots, only one of these short slots may be configured to include a DMRS symbol.

A factor that determines the position of a DMRS symbol in contiguous short slots may refer to the number of contiguous short slots as actually available. For example, even if three structurally contiguous short slots are available, as in the UL/DL configuration #0, the transmission of the DMRS may be determined by reference to the number of contiguous valid UL subframes based on a valid UL subframe.

For example, it may be configured such that if there are 3 contiguous valid UL subframes, the example in FIG. 13 may be employed; if there are 2 contiguous valid UL subframes, the example in FIG. 14 may be employed; if there are 1 contiguous valid UL subframe, the example in FIG. 12 may be employed.

If a short slot is used to transmit ACK/NACK feedback, and even when there are actually available contiguous short slots, the DMRS may be configured to be transmitted in all short slots. This may be because, unlike the channel for data transmission purposes, the payload size of the ACK/NACK feedback may be very small, and further, because a high density DMRS transmission is required in order to increase the reliability of the ACK/NACK information.

II-2. Approach to Construct a Long Slot to Support RSS

This section proposes an approach to construct a long slot in UL transmission (that is, transmission of NPUSCH) using RSS. In this connection, a long slot means a transmission unit composed of 8 or more symbols. The duration of the long slot may be defined as 3 subframes based on a reference subcarrier spacing (SCS), which determines the subframe boundary. For example, if the reference subcarrier spacing (SCS) that determines the subframe boundary is 15 kHz, the duration of the long slot may be configured to be 3 ms.

If the sum of the durations of the symbols constituting the long slot is shorter than the duration of a single subframe based on the reference subcarrier spacing (SCS) that determines the reference subframe boundary, a signal may not be transmitted on a remaining region to prevent waste of transmission power.

For example, if the reference subcarrier spacing (SCS) determining the subframe boundary is 15 kHz and the RSS is 3.75 kHz, the long slot may be composed of 10 symbols. This means that the duration of one symbol for 3.75 kHz is about 4 times larger than a duration of a symbol for 15 kHz. This may be because When the length of CP is 256/(15000× 2048) sec, the number of symbols that may fall within the 3 ms duration is limited to 10.

As another example, if the reference subcarrier spacing (SCS) determining the subframe boundary is 15 kHz and the RSS is 3.75 kHz, the long slot may contain one DMRS symbol. In this connection, the position of the DMRS may be configured to avoid a symbol position that may be used for SRS transmissions in the legacy LTE using 15 kHz subcarrier spacing (SCS). For example, the position of the DMRS symbol in the long slot may be configured to be the fifth or sixth symbol therein.

Figure 15:
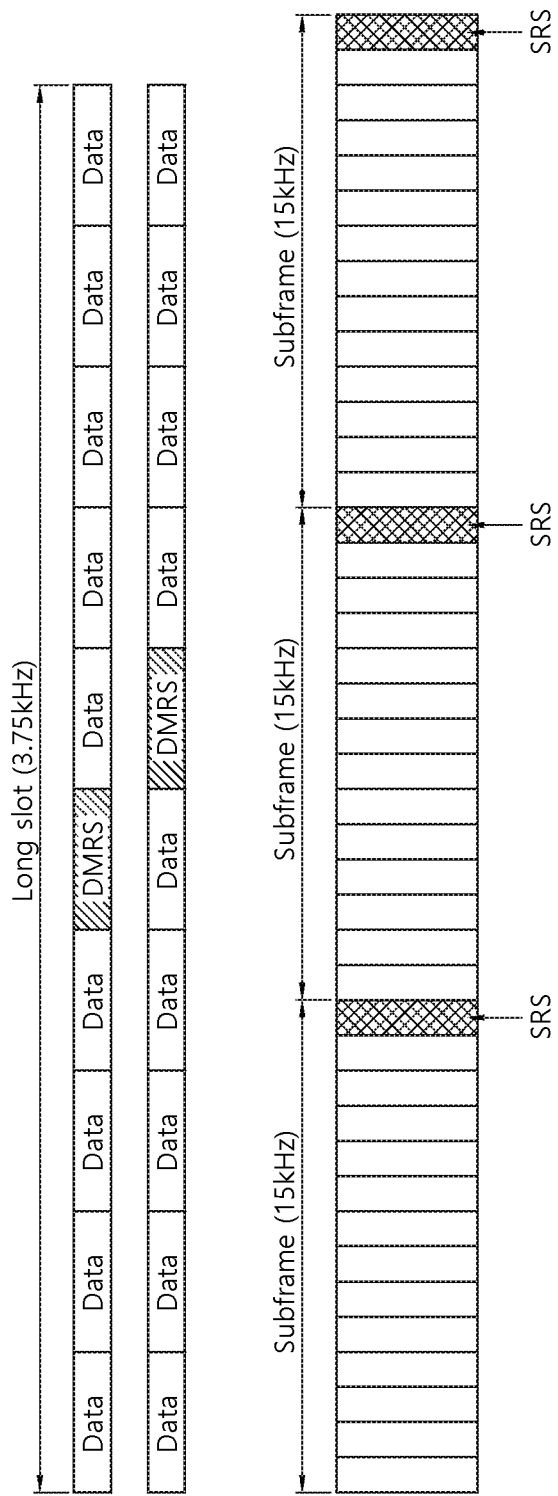
FIG. 15 shows an example of a long slot including a DMRS symbol.

FIG. 15 shows an example of a long slot designed to be used for a DMRS symbol.

As may be seen with reference to FIG. 15, a long slot may be configured such that the fifth or sixth symbol therein is used for the purposes of the DMRS symbol.

For example, if the reference subcarrier spacing (SCS) determining the subframe boundary is 15 kHz and the RSS is 3.75 kHz, the long slot may contain multiple DMRS symbols. In this connection, the position of the DMRS may be configured to avoid the position of a symbol that may be used for SRS transmissions in the legacy LTE using 15 kHz subcarrier spacing (SCS). Further, the positions of the DMRS symbols may be determined such that the spacings between the DMRS symbols are maintained uniformly to enhance the channel estimation performance.

Figure 16:
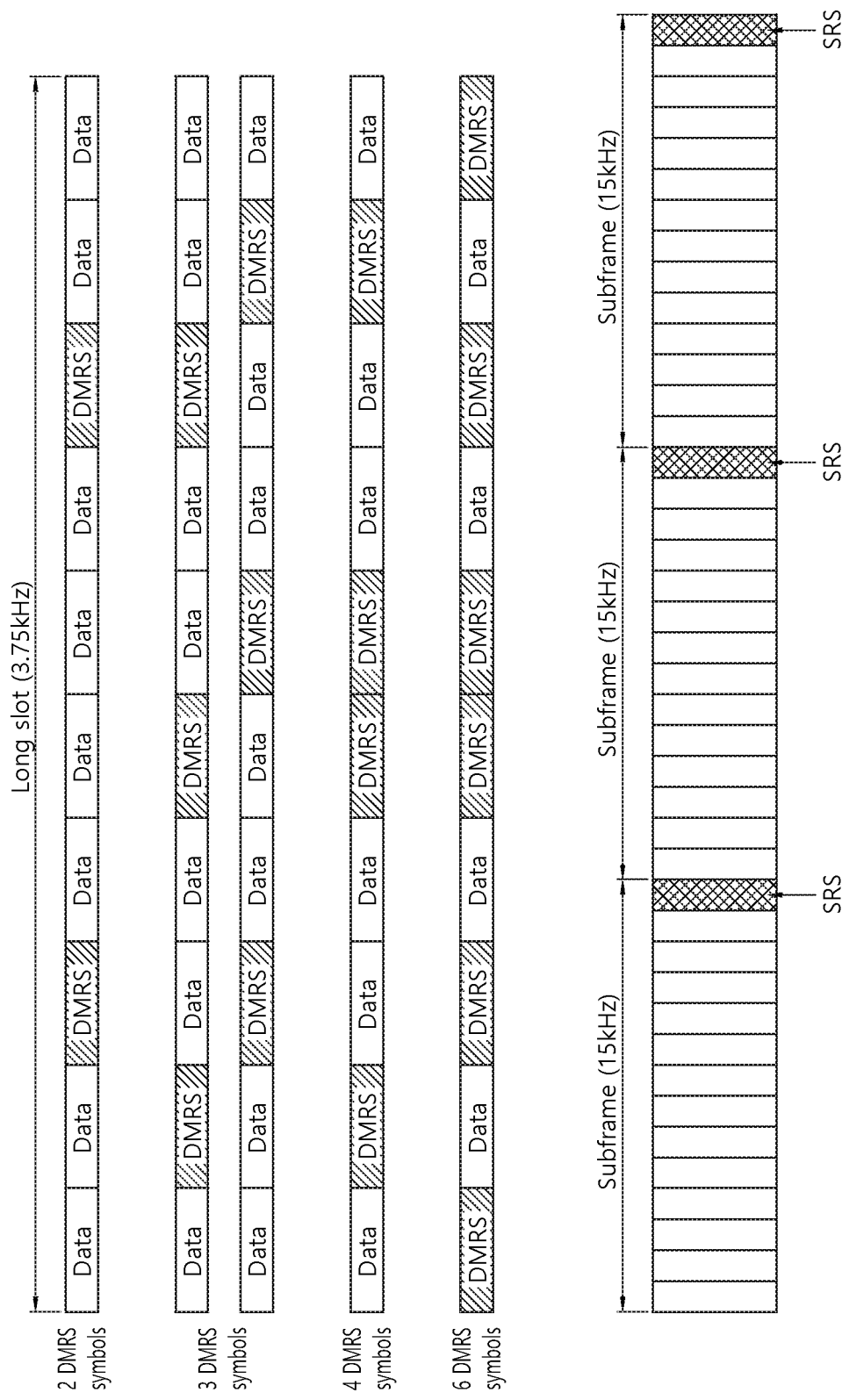
FIG. 16 shows a view showing a position of a DMRS symbol when DMRS symbols are included in a long slot.

FIG. 16 shows a position of a DMRS symbol when the DMRS symbols are included in a long slot.

Referring to FIG. 16, when two, three, four, and six DMRS symbols are included in a long slot, the positions of the available DMRS symbols are shown.

II-3. Selection of Slot Structure According to Number of Contiguous Subframes

In this section, the present disclosure proposes a method to determine the slot structure used in a specific RSS according to the number of contiguous subframes based on the reference subcarrier spacing (SCS) which determines the subframe boundary. The slot structure that may be selected in the suggested approach may be one or more of the short slot defined in the second suggestion, the long slot defined in the third suggestion, and a normal slot composed of seven symbols.

The factor used for selecting the slot structure in the suggested approach may be the index of the UL/DL configuration. For example, in the UL/DL configurations #0 and #3, the long slot may be employed; in the UL/DL configurations #1 and #4, the normal slot may be employed; in the UL/DL configuration #2 and #5, the short slot may be employed; in the UL/DL configuration #6, the long and short slots the long slot may be alternately employed. This may have a purpose for supporting the slot structure according to the situation because the numbers of contiguous UL subframes for the UL/DL configurations are different from each other.

A factor used for selecting the slot structure in the proposed approach may be the number of contiguous valid UL subframes based on the valid UL subframe. In this connection, the selected slot structure may be varied according to the number of contiguous valid UL subframes at each point in time. For example, while a specific transmission block is transmitted on N subframes; if the number of the contiguous valid UL subframes is three, a long slot may be employed; if the number of the contiguous valid UL subframes is two, a normal slot may be employed; and if the number of the contiguous valid UL subframes is one, a short slot may be employed.

Figure 17:
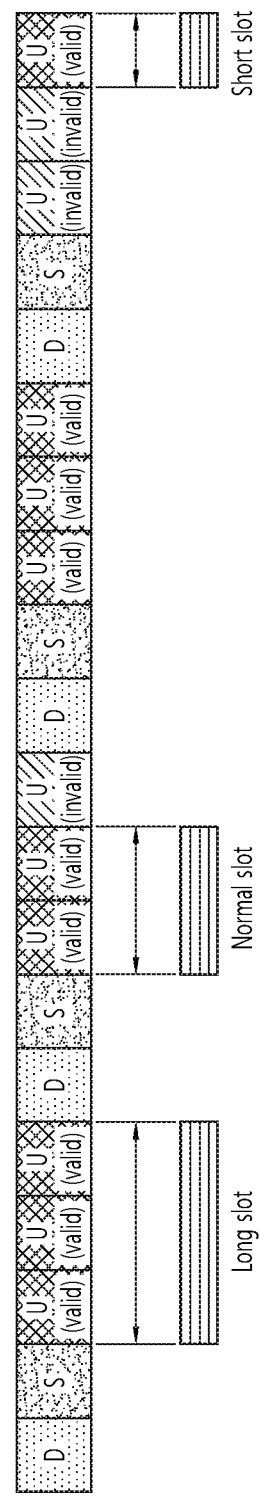
FIG. 17 shows an example of a slot structure used in UL transmission (i.e., transmission of NPUSCH) using RSS according to the number of UL valid subframes.

FIG. 17 shows an example of a slot structure used in UL transmission (that is, transmission of NPUSCH) using RSS according to the number of UL valid subframes.

Referring to FIG. 17, when the UL/DL configuration #0 is used, a slot structure used in UL transmission (that is, transmission of NPUSCH) using RSS according to the number of contiguous UL valid subframes is shown.

III. Third Suggestion: Approach to Match the Length of the Subframe Determined Based on the Reference Subcarrier Spacing (SCS) that Determines the Subframe Boundary and the Length of One Slot Based on RSS In this section, the present disclosure proposes an approach to match the size of a slot (that is, a transmission unit composed of 7 symbols) used in RSS-based transmission with the length of one subframe based on the reference subcarrier spacing (SCS) that determines the subframe boundary. In the following description, a slot defined based on the RSS is defined as an RSS-slot for convenience.

For example, if the reference subcarrier spacing (SCS), which determines the subframe boundary is 15 kHz, the length of a subframe using 15 kHz may be configured to be 1 ms. When RSS uses 7.5 kHz, the length of one RSS-slot constituting 7.5 kHz may be configured to be 1 ms. In this connection, an RSS-slot of 7.5 kHz may be configured to be composed of 7 symbols.

In another example, if the reference subcarrier spacing (SCS) determining the subframe boundary is 15 kHz and RSS is 7.5 kHz, an RSS-slot may contain one DMRS symbol. In this connection, the position of the DMRS symbol may be configured to be a fourth symbol in the RSS-slot.

IV. Fourth Suggestion: Approach to Select RSS to be Used Based on Signal

In this section, the present disclosure suggests an approach to select the RSS that the user equipment may use based on signal information if there is at least one available RSS.

In this connection, the signal information may be information on a type of RSS supported by the base station. For example, when the sub-carrier spacing (SCS) available as RSS is 3.75 kHz and 7.5 kHz, the base station may inform the user equipment UE of information about the RSS to be used by the UE via a higher layer signal such as SIB or RRC signal.

In this connection, the signal information may be information about the RSS that the user equipment should use. For example, when the sub-carrier spacing (SCS) available as RSS is 3.75 kHz and 7.5 kHz, the base station may also provide information about the RSS to be used by the user equipment via signal information. If the information on the corresponding RSS is cell-common information, the corresponding information may also be transmitted via higher layer signals such as SIBs. If the information about the corresponding RSS is directed to a specific user equipment, the corresponding information may be delivered via higher layer signals such as RRC signals, or dynamically transmitted via DCI. Alternatively, when the subcarrier spacing (SCS) information is contained in the second message (MSG2) (for example, RAR) of the random access procedure performed via the NPRACH, the user equipment may then determine the subcarrier spacing (SCS) to use based on the SCS information.

In this connection, the signal information may be information indicating whether RSS is supported. For example, when there is one or more subcarrier spacing (SCS) available as RSS, the base station may inform whether the user equipment that had access thereto uses the RSS via RSS or higher layer signals such as SIB or RRC signals.

In this connection, instead of the base station providing the signal separately, the user equipment may also be able to infer the selectable RSS via UL/DL configuration information. For example, when the RSS-available subcarrier spacing (SCS) is 3.75 kHz and 7.5 kHz, the usable RSS is defined for each UL/DL configuration index. The user equipment may also be configured to select the RSS adapted to the UL/DL configuration. This method has the advantage that no additional signal overhead occurs.

V. Fifth Suggestion: Approach to Allow RSS-Based UL Transmission (that is, Transmission of NPUSCH) Even when there is Invalid Subframe If an invalid UL subframe is present, there may be a UL invalid subframe at the timing when the user equipment wants to perform UL transmission (that is, transmission of NPUSCH). Especially, when the RSS is used and the slot using the RSS is configured to have a length of 2 ms or larger, it may happen that a partial (or entire) duration of the slot overlaps with a point at which the UL invalid subframe occurs.

In the fifth suggestion, even if a partial duration of the slot configured using the RSS overlaps with the UL invalid subframe, the user equipment may be configured to ignore the invalid UL subframe and perform UL transmission (that is, transmission of the NPUSCH). The base station expects the user equipment to perform RSS-based transmission at the corresponding position and, thus, uses the scheduling to prevent collisions or, in the event of a collision, performs decoding in consideration of the effect thereof.

In the fifth suggestion approach, if the DMRS position of the RSS-based slot is at the position of the UL invalid subframe, the user equipment may perform transmission by replacing the position of the DMRS with a position where the UL invalid subframe does not exist.

Figure 18:
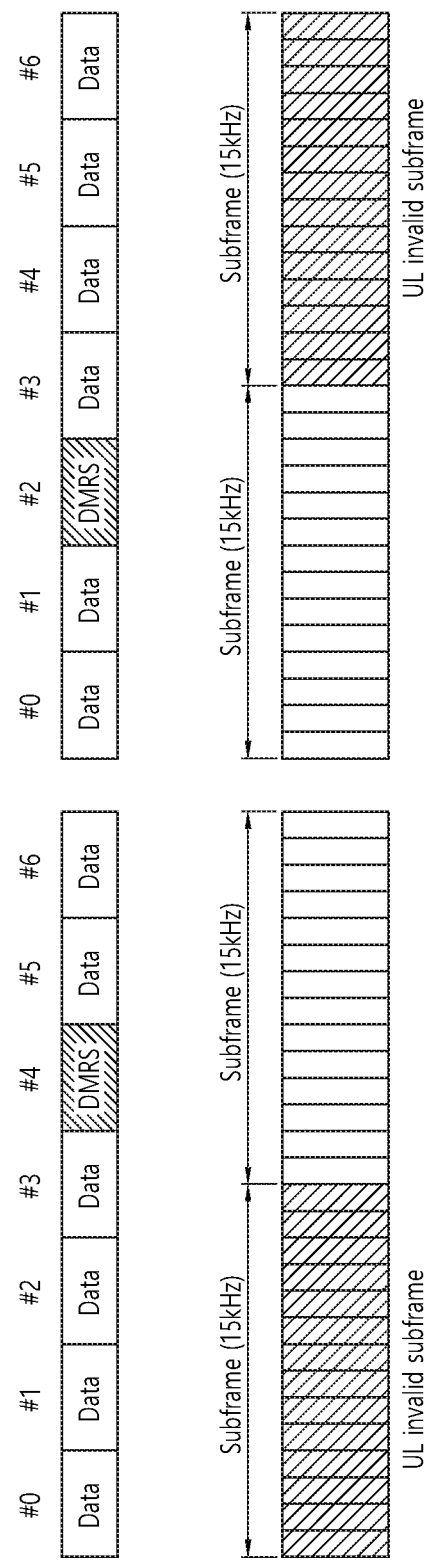
FIG. 18 shows an exemplary diagram illustrating a position of the DMRS when an approach of a fifth suggestion is used.

FIG. 18 shows an example showing the position of DMRS as an example when the fifth suggestion approach is used.

As shown, when a #4 symbol is generally used for a DMRS purpose in a slot structure using 3.75 kHz subcarrier spacing (SCS) and if the corresponding symbol is specified as a UL invalid subframe, the user equipment may be configured to perform the transmission by adjusting the DMRS position to a position #2.

In the fifth suggestion, the transmission power of symbols that conflict with the position of the UL invalid subframe may differ from the transmission power of other symbols. For example, symbols at the corresponding position may be configured to lower the power thereof for the purpose of reducing the impact on UL transmission (that is, transmission of NPUSCH) used for other purposes. Alternatively, the symbols at the corresponding positions may be configured to raise transmission power up and perform the transmission to satisfy the transmission reliability of the user equipment using RSS.

The transmission power may be configured to depend on the repetition level. If the repetition level is 1, the user equipment may also perform transmission using maximum power. This is because if the repetition level is 1, an entirety of the maximum transmission power available to the user equipment may not be consumed. If the repetition level is not equal to 1, the user equipment may perform transmission by lowering the transmission power. This may be to compensate for a collision in the invalid UL subframe region if the transmission power is insufficient. Further, the transmission power may be determined by the base station. This may have the purpose to allow the base station to control the impact of collision with other purpose-based UL transmissions (that is, transmission of NPUSCH) via scheduling adapted to the situation.

VI. Sixth Suggestion: Approach to Configure Position of DMRS Differently from that in FDD in Slot Configuration for RSS Transmission (that is, Transmission of NPUSCH)

In the TDD situation, there may be situations where the U/D configuration changes dynamically as in the eIMTA situation. If the user equipment cannot obtain dynamic TDD configuration information as in the eIMTA, a portion of the UL transmission (that is, the transmission of the NPUSCH) that is scheduled may conflict with the DL transmission channel for other user equipment. In order to prevent such a phenomenon, the DMRS position in the RSS-based slot for TDD UL transmission (that is, transmission of NPUSCH) in the NB-IoT may be set differently from the DMRS position in the FDD-based slot. Thus, even if a collision occurs, the base station may enhance the decoding performance of the NPUSCH based on the DMRS.

The at least one approach proposed below may be used in combination with each other. Further, when a TDD structure is used, any one approach may be always used by default, or, any one approach may be configured via higher layer signals such as SIB or RRC signals or DCI.

VI-1. Approach for Placing Position of the DMRS in a Position of the First UL Subframe of the Contiguous UL Subframes when One DMRS is Used in an RSS-Based Slot Structure This suggestion proposes an approach to position the DMRS in a position of the UL subframe which is always used in UL in serving and/or neighboring cells in a structure in which RSS is used and one DMRS is contained one slot as in NPUSCH format 1.

Figure 19:
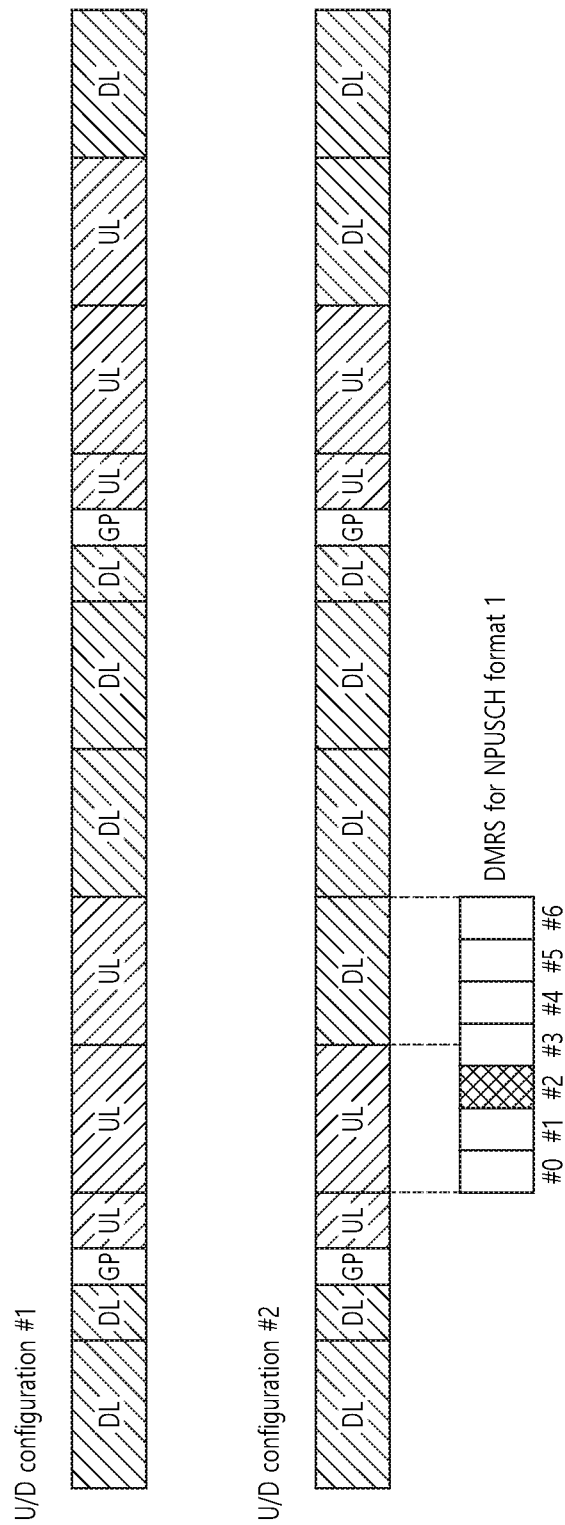
FIG. 19 shows an example of arranging the DMRS according to an approach of suggestion 6-1.

FIG. 19 is an illustration of an example of positioning a DMRS according to the approach VI-1.

Specifically, the corresponding position may determine the symbol index of the DMRS so that the position of the UL subframe recognized by the user equipment may avoid the position at which a DL subframe may be used when the eIMTA occurs. For example, the corresponding position may be one of #0, #1, and #2 in the NB-slot if one DMRS symbol is included as in the NPUSCH format 1.

VI-2. Approach by which DMRSs are Distributed in Multiple UL Subframes when Multiple DMRSs are Used in an RSS-Based Slot Structure In this section, the present disclosure proposes an approach to distribute the positions of the DMRS between multiple UL subframe positions in a structure in which RSS is used and multiple DMRSs is contained in one slot as in NPUSCH format 2. If three DMRS symbols are included as in NPUSCH format 2, and if #0, #1 and #2 are used as DMRS as in FDD, all data symbols may collide with DL subframes due to the eIMTA. To prevent this, the positions of the DMRSs may be configured differently from those in the FDD. In this connection, the DMRS positions may be determined by placing two or more DMRS symbols into positions that are always likely to be used as UL subframes among contiguous two or more UL subframes, and by placing at least one data symbol. In this connection, the number of DMRS symbols may be configured to be always greater than or equal to the number of data symbols.

Figure 20:
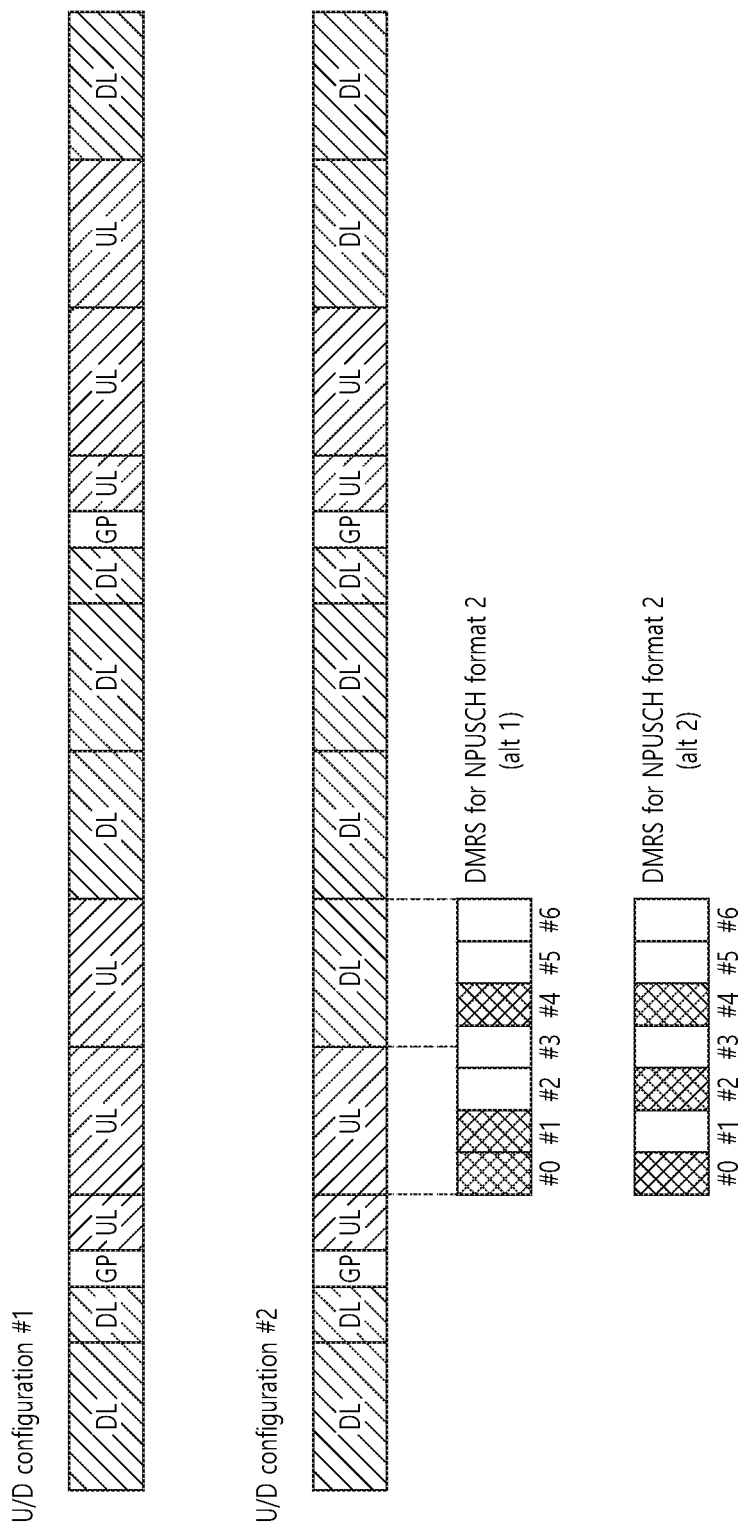
FIG. 20 is an exemplary diagram showing an example of arranging the DMRS according to an approach of suggestion 6-2.

FIG. 20 is an example of an example of positioning a DMRS according to the approach VI-2.

For example, the positions of #0, #2, #4 in the NB-slot may be used for DMRS purpose. This may have the purpose of increasing the channel estimation performance of the data symbol position by arranging one data symbol between the NRS symbols. In another example, the positions of #0, #1, and #4 may be used for DMRS purpose. This may have the purpose of enhancing PAPR and/or CM performance by positioning at least two DMRS symbols to be contiguous.

VI-3. Approach to Distribute Two or More DMRSs Between Multiple UL Subframes in a Slot Structure Using RSS and to Differentially Configure Transmission Powers Between Symbols in a Slot In this section, the present disclosure considers a case where the transmission powers between symbols in one slot are different when RSS is used.

Specifically, in this section, there is proposed an approach for reducing the transmission power of symbols included in a corresponding UL subframe to reduce the effect of UL transmission (that is, transmission of NPUSCH) from general user equipment on DL transmission from user equipment using the eIMTA in a situation where some UL subframes may be dynamically and instantly configured as DL subframes via a technique such as the eIMTA. Conversely, it may be considered that the transmission power of the symbols included in the corresponding UL subframe is increased in order to overcome the interference of UL transmission from user equipment using the eIMTA toward UL transmission (that is, transmission of NPUSCH) from general user equipment.

In this connection, a corresponding UL subframe means a subframe that is configured as a UL subframe but may be instantly used for the purpose of a DL subframe. In this case, if user equipment performing RSS-based UL transmission (that is, transmission of NPUSCH) cannot know whether the eIMTA scheme is used in the cell, the corresponding user equipment may adjust the transmission power as described above after receiving an associated configuration via a higher layer signal and/or via the DCI. In this connection, if transmission powers are different between symbols in a slot, the phase continuity of the transmission stage may be affected and thus the performance of channel estimation via the DMRS may be affected.

To prevent this, the present disclosure proposes a method by which more than at least one DMRS symbol is allocated to each region corresponding to each transmission power.

Figure 21:
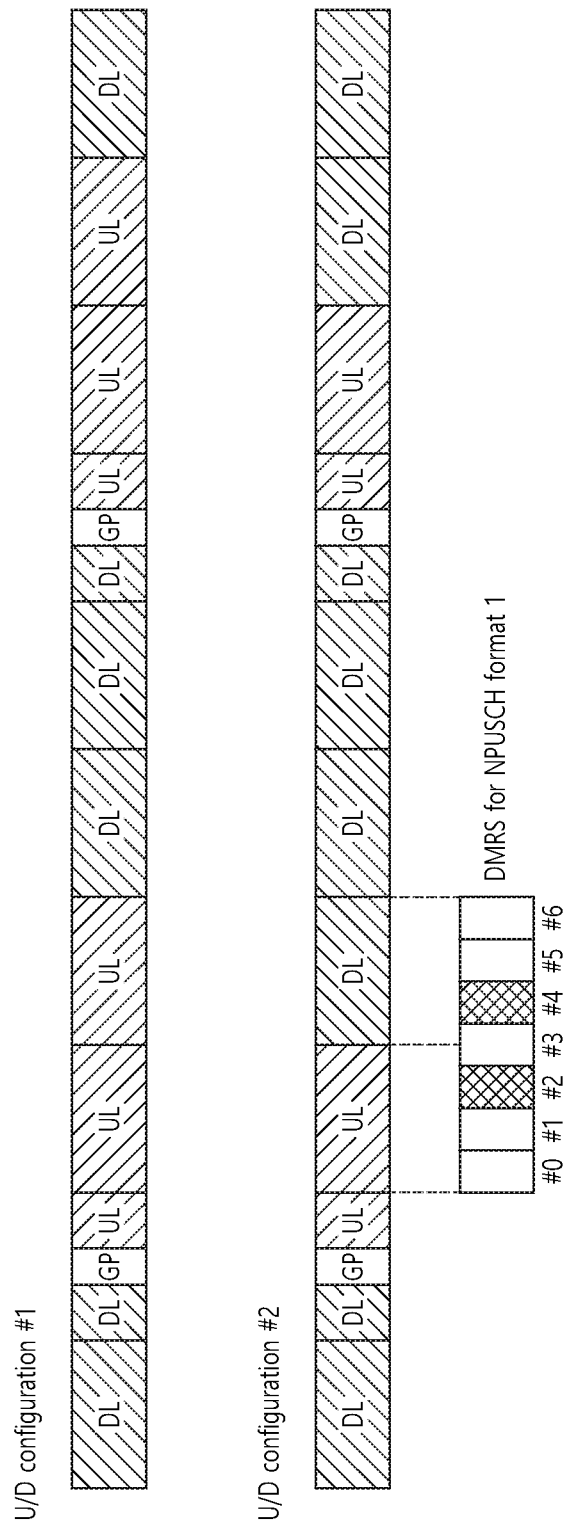
FIG. 21 shows an example of positioning the DMRS according to an approach of suggestion 6-3.

FIG. 21 is an illustration of an example of positioning DMRSs according to the approach VI-3.

For example, if the structure of a slot using RSS spans two UL subframes, one of the symbols corresponding to the first UL subframe region (for example, #2) and one of the symbols corresponding to the second UL subframe region (for example, #4) may be used for the purpose of the DMRS. In this case, the transmission powers of symbols #0, #1, and #2 and the transmission powers of #3, #4, #5, and #6 may be different from each other.

VII. Approach to Transmit UL Data Based on RSS when Invalid Subframe Exists

If a UL invalid subframe is present, there may be a UL invalid subframe at the timing when the user equipment wants to perform UL transmission (that is, transmission of NPUSCH). Especially, when the RSS is used and the slot using RSS is configured to have a length of 2 ms or larger, it may happen that the partial (or entire) duration of the slot overlaps with a point at which the UL invalid subframe occurs.

In order to solve this problem, this proposal may suggest RSS-based transmission methods with considering a case when an invalid subframe exists in transmission duration of RSS.

VII-1. Approach to Postpone Transmission on a Corresponding RSS-Based Slot if there is an Invalid Subframe in the RSS-Based Slot In this section, the present disclosure proposes an approach to postpone transmission on a RSS-based corresponding slot when the transmission duration of the slot using RSS includes an invalid subframe. For example, when a RSS-based slot has a 2-ms-long slot structure, the RSS-based slot may be divided into a valid subframe that can be used for transmission purposes and that has a 1 ms in length, and an invalid subframe that cannot be used for transmission purposes and that has a 1 ms length. In this connection, the transmission on the RSS-based slot may be performed only if there are two consecutive valid subframes. If at least one of the two contiguous subframes is invalid, all of the transmissions on the corresponding subframes may be disallowed. In this connection, the transmission duration may be postponed to a position in which next two contiguous valid subframes are present.

VII-2. Approach to Puncture Symbols Contained in the Invalid Subframe Duration Among Symbols in a RSS-Based Corresponding Slot when the Invalid Subframe Exists in the Slot Using RSS This section proposes an approach for puncturing symbols that are positioned in the invalid subframe in the corresponding slot when the invalid subframe is included in the transmission duration of the slot using RSS. For example, if a RSS-based slot has a 2-ms-long slot structure, the RSS-based slot may be divided into a valid subframe that can be used for transmission purposes and that has a 1 ms in length, and an invalid subframe that cannot be used for transmission purposes and that has a 1 ms length. In this connection, if one of the two contiguous subframes required for transmission on the RSS-based slot is an invalid subframe, the approach may also puncture all the symbols on the RSS slot that span the corresponding invalid subframe duration.

If the RSS-based slot has a slot structure of 2 ms length, the RSS-based slot may be divided into a valid subframe that can be used for transmission purposes and that has a 1 ms in length, and an invalid subframe that cannot be used for transmission purposes and that has a 1 ms length. If all of the two contiguous subframes required for transmission on the RSS-based slot are invalid, (1) the corresponding slots are all punctured, or (2) transmission on the corresponding slot may be postponed, as in the VII-1 approach.

In the approach VII-2, if the reference signal is included in the symbol to be punctured, the approach may also be configured based on one of three options below.

Option VII-2-1.

Puncturing does not apply to transmission on the corresponding slot. This may cause interference to other purpose transmissions that may be performed on the invalid subframe duration, but may also have the advantage of preserving the reference signal and data.

Option VII-2-2.

Transmission on the corresponding slot may be postponed. This is advantageous in that the complexity of the implementation of the user equipment is reduced because the transmission of the reference signal can be guaranteed without greatly changing the RSS-based slot structure.

Option VII-2-3.

The reference signal may be shifted to a duration in which the transmission on the corresponding slot is possible. Instead, other data symbols may be punctured in place of the reference signal. This is advantageous in that the puncturing can be consistently applied while guaranteeing the reference signal at all times, although this is disadvantageous in that the complexity may increase because the user equipment must re-adjust the position of the reference signal.

VII-3. Approach for Selecting Between Postponing or Puncturing Based on Specific Factor when there is an Invalid Subframe in the RSS-Based Slot This section is suggesting an approach that allows either postponing or puncturing to be selectively applied based on a specific factor when the transmission duration on the RSS-based slot includes an invalid subframe. In this connection, the postponing may follow the approach as suggested in VII-1 above, whereas the puncturing may follow the approach suggested in VII-2 above.

The specific factor may be a level at which RSS-based transmission is repeated. For example, if the level of the repetition is smaller than or equal to a specific value, the transmission may be postponed according to the approach as proposed in VII-1. If the specific value is exceeded by the repetition level, the transmission symbol may be punctured according to the approach suggested in VII-2. This may be because if the number of repetitions is small, puncturing some symbols may allow the information contained in the corresponding symbols to be lost and allow the code rate to increase significantly, resulting in lack of opportunities to compensate for the same. On the other hand, this may have a purpose that, if the number of repetitions is large, the punctured symbol at a specific position is likely to be transmitted via the repetition, and may have a purpose that when the postponing is applied, this approach is to avoid the disadvantage of increasing the time required to complete the transmission.

Alternatively, the specific factor may be configured by the base station. For example, the specific factor may be configured for the user equipment via a higher layer signal, such as an SIB or RRC signal, or dynamically configured for the user equipment via the DCI. This has the advantage that the base station can control puncturing and postponing to be adapted to the situation.

In an alternative, the specific factor may be determined based on the capabilities of the user equipment, the user equipment category, or the version (or release) supported by the user equipment. This may have a purpose that the postponing approach can be implemented simply without changing the slot structure or increasing the complexity, whereas in the puncturing approach, different methods to be supported between different UEs may be allowed because issues such as a method for separately securing the transmission position of the reference signal may occur.

The embodiments of the present invention as described so far may be implemented by various means. For example, the embodiments of the present invention may be implemented by hardware, firmware, software, or a combination thereof. More specifically, the description will be made with reference to the drawings.

Figure 22:
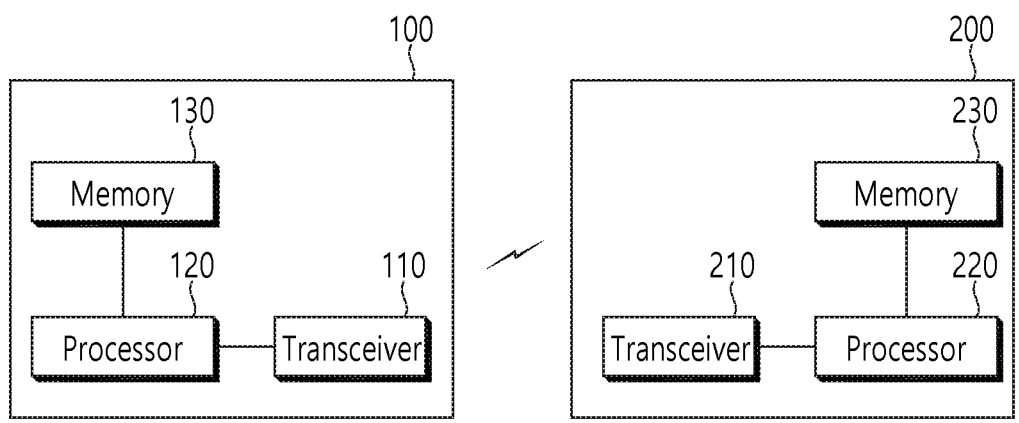
FIG. 22 is a block diagram depicting a wireless device and a base station in which the present disclosure is implemented.

FIG. 22 is a block diagram of the wireless device and base station in which the disclosure is implemented.

Referring to FIG. 22, the wireless device 100 and the base station 200 may implement the disclosure of the Present disclosure.

The illustrated wireless device 100 includes a processor 101, a memory 102, and a transceiver 103. Similarly, the illustrated base station 200 includes a processor 201, a memory 202, and a transceiver 203. The processors 101 and 201, the memories 102 and 202, and the transceivers 103 and 203 may be implemented as separate chips, or at least two blocks/functions may be implemented via one chip.

The transceivers 103 and 203 include a transmitter and a receiver. When a specific operation is performed, only the operation of either the transmitter or the receiver may be performed, or both the transmitter and the receiver operation may be performed. The transceivers 103 and 203 may include at least one antenna for transmitting and/or receiving a radio signal. Further, the transceivers 103 and 203 may include an amplifier for amplifying a reception signal and/or a transmission signal, and a band-pass filter for transmission on a specific frequency band.

The processors 101 and 201 may implement the suggested functions, processes and/or methods in the present disclosure. The processors 101 and 201 may include an encoder and a decoder. For example, the processors 101 and 202 may perform operations according to the above-described contents. These processors 101 and 201 may include ASIC (application-specific integrated circuits), other chipsets, logic circuits, data processing units, and/or converters for converting baseband signals and radio signals to each other.

The memories 102, 202 may include ROM (read-only memory), RAM (random access memory), flash memory, memory cards, storage media, and/or other storage devices.

Figure 23:
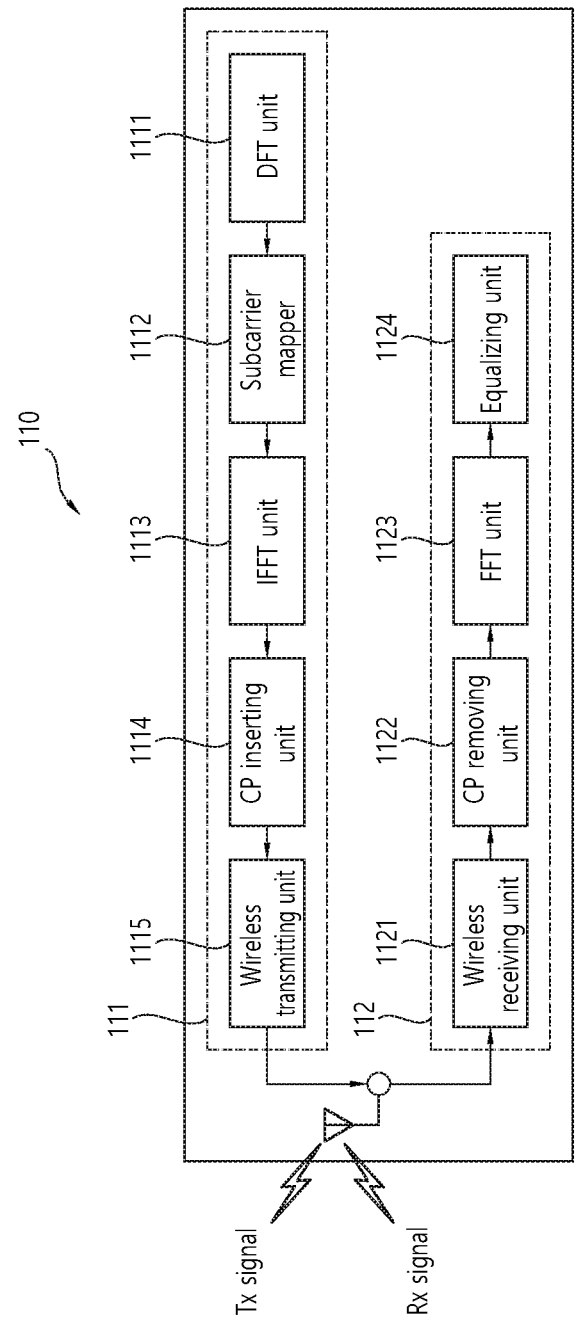
FIG. 23 is a detailed block diagram of a transceiver of the wireless device shown in FIG. 22.

FIG. 23 is a detailed block diagram of the transceiver of the wireless device shown in FIG. 22.

Referring to FIG. 23, the transceiver 110 includes a transmitter 111 and a receiver 112. The transmitter 111 includes a DFT (discrete Fourier transform) unit 1111, a subcarrier mapper 1112, an IFFT unit 1113, a CP inserting unit 11144, and a radio transmitter 1115. The transmitter 111 may further include a modulator. Further, in an example, the transmitter 111 may further include a scrambler unit (not shown); a modulation mapper (not shown); a layer mapper (not shown); and a layer permuter (not shown). These components may be arranged in front of the DFT unit 1111. That is, in order to prevent an increase in the PAPR peak-to-average power ratio, the transmitter 111 first passes information to the DFT 1111 before mapping a signal to a subcarrier. The transmitter 111 maps a signal spread (or other words, precoded) via DFT unit 1111 to a subcarrier via the subcarrier mapper 1112 and then passes the mapping to IFFT (inverse fast Fourier transform) unit 1113 to generate a signal on the time axis.

The DFT unit 1111 performs DFT on the symbols input thereto to output a complex symbol. For example, if Ntx symbols are input (Ntx is a natural number), the DFT size is Ntx. The DFT unit 1111 may be referred to as a transform precoder. The subcarrier mapper 1112 maps each complex symbol to each subcarrier of the frequency domain. The complex symbols may be mapped to resource elements corresponding to resource blocks allocated for data transmission. The subcarrier mapper 1112 may also be referred to as a resource element mapper. The IFFT unit 1113 performs IFFT on the input symbol and outputs a baseband signal for data, which is a time region signal. The CP inserting unit 1114 copies a portion of the rear part of the base band signal for data and inserts the same in front of the base band signal for data. ISI (Inter-symbol Interference), and ICI (Inter-Carrier Interference) can be prevented via CP insertion to maintain the orthogonality even in the multipath channel.

In one example, the receiver 112 includes a wireless receiving unit 1121, a CP removing unit 1122, an FFT unit 1123, and an equalizing unit 1124. The wireless receiving unit 1121, the CP removing unit 1122, and the FFT unit 1123 of the receiver 112 perform the inverse functions to those of the radio transmitting unit 1115, the CP inserting unit 1114, and the IFF unit 1113 in the transmitting stage 111. The receiver 112 may further include a demodulator.

What is claimed is:

1. A method for performing a narrowband physical uplink shared channel (NPUSCH) transmission, the method comprising:
    determining a start position of the NPUSCH transmission in a first group of two contiguous subframes that are configured as time division duplex (TDD) uplink subframes, wherein the first group of two contiguous subframes are defined for a subcarrier spacing of 3.75 kHz; and
    postponing the NPUSCH transmission to a second group of two contiguous subframes that are subsequent to the first group of two contiguous subframes, based on that the start position of the NPUSCH transmission is determined as a second subframe of the first group of two contiguous subframes.

2. The method of claim 1, further comprising:
    performing the NPUSCH transmission in the first group of two contiguous subframes based on that the start position of the NPUSCH transmission is determined as a first subframe of the first group of two contiguous subframes.

3. The method of claim 2, wherein the NPUSCH transmission is performed in the first group of two contiguous subframes further based on that the first group of two contiguous subframes does not overlap with any uplink subframe that is configured as an invalid subframe.

4. The method of claim 1, wherein the first group of two contiguous subframes are configured as TDD uplink subframes based on at least one of TDD configurations 1 or 4.

5. The method of claim 1, wherein the NPUSCH transmission is postponed to the second group of two contiguous subframes, further based on that at least one of the first group of two contiguous subframes overlaps with an uplink subframe that as an invalid subframe.

6. The method of claim 1, wherein the NPUSCH transmission is postponed to the second group of two contiguous subframes further, based on that the first group of two contiguous subframes overlaps with a narrowband physical random access channel (NPRACH) transmission.

7. The method of claim 1, wherein the NPUSCH transmission is mapped to a plurality of resource elements (REs) which are not used for a reference signal.

8. The method of claim 1, wherein the NPUSCH transmission is postponed to the second group of two contiguous subframes further based on that at least one of the first group of two contiguous subframes overlapping with an uplink subframe that is configured as an invalid subframe, and further based on that a repetition level of the NPUSCH transmission is smaller than or equal to a threshold value, and
    wherein the NPUSCH transmission is punctured based on that at least one of the first group of two contiguous subframes overlapping with an uplink subframe that is configured as an invalid subframe, and based on that the repetition level of the NPUSCH transmission is greater than or equal to the threshold value.

9. The method of claim 1, wherein the NPUSCH transmission is postponed to the second group of two contiguous subframes further based on that the first group of the two contiguous subframes overlapping with fewer than or equal to 1 uplink subframe that is configured as a valid subframe.

10. The method of claim 1, wherein based on that at least one of the first group of two contiguous subframes overlapping with an uplink subframe that is configured as an invalid subframe, the NPUSCH transmission that is mapped to a resource element (RE) in the invalid subframe is punctured.

11. A wireless device for performing a narrowband physical uplink shared channel (NPUSCH) transmission, the wireless device comprising:
    a transceiver;
    at least one processor; and
    at least one computer memory operably connectable to the at least one processor and storing instructions that, when executed by the at least one processor, perform operations comprising:
    determining a start position of the NPUSCH transmission in a first group of two contiguous subframes that are configured as time division duplex (TDD) uplink subframes, wherein the first group of two contiguous subframes are defined for a subcarrier spacing of 3.75 kHz; and
    postponing the NPUSCH transmission to a second group of two contiguous subframes that are subsequent to the first group of two contiguous subframes, based on that the start position of the NPUSCH transmission is determined as a second subframe of the first group of two contiguous subframes.

12. The wireless device of claim 11, wherein the operations further comprise:
performing the NPUSCH transmission in the first group of two contiguous subframes, based on that the start position of the NPUSCH transmission is determined as a first subframe of the first group of two contiguous subframes.

13. The wireless device of claim 12, wherein the NPUSCH transmission is performed in the first group of two contiguous subframes further based on that the first group of two contiguous subframes does not overlap with any uplink subframe that is configured as an invalid subframe.

14. The wireless device of claim 11, wherein the first group of two contiguous subframes are configured as TDD uplink subframes based on at least one of TDD configurations 1 or 4.

15. The wireless device of claim 11, wherein the NPUSCH transmission is postponed to the second group of two contiguous subframes, further based on that at least one of the first group of two contiguous subframes overlaps with an uplink subframe that configured as an invalid subframe.

16. The wireless device of claim 11, wherein the NPUSCH transmission is postponed to the second group of two contiguous subframes, further based on that the first group of two contiguous subframes overlaps with a narrowband physical random access channel (NPRACH) transmission.

17. The wireless device of claim 11, wherein the NPUSCH transmission is mapped to a plurality of resource elements (REs) which are not used for a reference signal.

18. The wireless device of claim 11, wherein the NPUSCH transmission is postponed to the second group of two contiguous subframes further based on that at least one of the first group of two contiguous subframes overlapping with an uplink subframe that is configured as an invalid subframe, and further based on that a repetition level of the NPUSCH transmission is smaller than or equal to a threshold value,
wherein the NPUSCH transmission is punctured based on that at least one of the first group of two contiguous subframes overlapping with an uplink subframe that is configured as an invalid subframe, and further based on that the repetition level of the NPUSCH transmission is greater than or equal to the threshold value.

19. The wireless device of claim 11, wherein the NPUSCH transmission is postponed to the second group of two contiguous subframes further based on that the first group of two contiguous subframes overlapping with fewer than or equal to 1 uplink subframe that is configured as a valid subframe.

20. The wireless device of claim 11, wherein based on that at least one of the first group of two contiguous subframes overlapping with an uplink subframe that is configured as an invalid subframe, the NPUSCH transmission that is mapped to a resource element (RE) in the invalid subframe is punctured.

* * * * *